US012720042B2

(12) United States Patent
Yan et al.

(10) Patent No.: US 12,720,042 B2
(45) Date of Patent: Aug. 25, 2026

(54) PLANAR MODE IMPROVEMENT FOR INTRA PREDICTION

(71) Applicant: BEIJING DAJIA INTERNET INFORMATION TECHNOLOGY CO., LTD., Beijing (CN)

(72) Inventors: Ning Yan, San Diego, CA (US); Yi-Wen Chen, San Diego, CA (US); Xiaoyu Xiu, San Diego, CA (US); Wei Chen, San Diego, CA (US); Che-Wei Kuo, San Diego, CA (US); Hong-Jheng Jhu, San Diego, CA (US); Han Gao, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 27 days.

(21) Appl. No.: 18/891,333

(22) Filed: Sep. 20, 2024

(65) Prior Publication Data

US 2025/0016308 A1 Jan. 9, 2025

Related U.S. Application Data

(63) Continuation-in-part of application No. 18/669,692, filed on May 21, 2024, now Pat. No. 12,425,610, and (Continued)

(51) Int. Cl.
*H04N 19/105* (2014.01)
*H04N 19/159* (2014.01)
*H04N 19/176* (2014.01)

(52) U.S. Cl.
CPC ......... *H04N 19/105* (2014.11); *H04N 19/159* (2014.11); *H04N 19/176* (2014.11)

(58) Field of Classification Search
None
See application file for complete search history.

(56) References Cited

U.S. PATENT DOCUMENTS 11,445,185 B2 * 9/2022 Lee ...................... H04N 19/117
11,570,428 B2 * 1/2023 Lim ..................... H04N 19/132
(Continued)

FOREIGN PATENT DOCUMENTS

JP 2010011075 A 1/2010
KR 1020190127991 A 11/2019
(Continued)

OTHER PUBLICATIONS

International Search Report and Written Opinion in related PCT Application No. PCT/US2023/015869 dated Jun. 29, 2023 (8 pages).
(Continued)

*Primary Examiner* — Mohammad J Rahman
(74) *Attorney, Agent, or Firm* — Bayes PLLC

(57) ABSTRACT

Implementations of the disclosure provide a video processing apparatus and method for performing intra prediction on a video block. The video processing method may include receiving, by a processor, reference samples from a video frame of a video comprising the video block. The video processing method may further include determining, by the processor, a reference sample filter based on a size of each video block. The reference sample filter is among a plurality of reference sample filters each derived for a different video block size. The video processing method may also include applying, by the processor, the determined reference sample filter to the received reference samples. The video processing method may additionally include performing, by the processor, the intra prediction on the video block using the filtered reference samples.

18 Claims, 29 Drawing Sheets

Related U.S. Application Data a continuation of application No. PCT/US2023/015869, filed on Mar. 22, 2023, said application No. 18/669,692 is a continuation of application No. PCT/US2022/050696, filed on Nov. 22, 2022.

(60) Provisional application No. 63/322,478, filed on Mar. 22, 2022, provisional application No. 63/281,822, filed on Nov. 22, 2021.

(56) References Cited

U.S. PATENT DOCUMENTS

| | | | | |
|---|---|---|---|---|
| 11,689,729 | B2 * | 6/2023 | Filippov | H04N 19/105<br>375/240.12 |
| 2008/0310507 | A1 * | 12/2008 | Ye | H04N 19/18<br>375/E7.199 |
| 2011/0255591 | A1 | 10/2011 | Kim et al. | |
| 2011/0280304 | A1 | 11/2011 | Jeon et al. | |
| 2011/0293001 | A1 | 12/2011 | Lim et al. | |
| 2012/0082224 | A1 | 4/2012 | Van Der Auwera et al. | |
| 2012/0093426 | A1 | 4/2012 | Sato | |
| 2012/0147955 | A1 | 6/2012 | Budagavi | |
| 2013/0301889 | A1 * | 11/2013 | Abramoff | G06V 40/193<br>382/128 |
| 2015/0023405 | A1 | 1/2015 | Joshi et al. | |
| 2015/0379708 | A1 * | 12/2015 | Abramoff | G06F 18/2135<br>382/128 |
| 2018/0324417 | A1 | 11/2018 | Karczewicz et al. | |
| 2019/0007688 | A1 | 1/2019 | Zhang et al. | |
| 2019/0110052 | A1 | 4/2019 | Liu et al. | |
| 2019/0158827 | A1 | 5/2019 | Sim et al. | |
| 2019/0273948 | A1 * | 9/2019 | Yin | H04N 19/172 |
| 2019/0306533 | A1 | 10/2019 | Baylon et al. | |
| 2020/0021828 | A1 | 1/2020 | Cho et al. | |
| 2020/0136865 | A1 * | 4/2020 | Huang | H04L 25/03012 |
| 2020/0359016 | A1 | 11/2020 | Li et al. | |
| 2021/0021818 | A1 | 1/2021 | Lee et al. | |
| 2021/0127122 | A1 | 4/2021 | Filippov et al. | |
| 2021/0160491 | A1 | 5/2021 | Filippov et al. | |
| 2022/0053213 | A1 * | 2/2022 | Yoo | H04N 19/182 |
| 2022/0078423 | A1 * | 3/2022 | Zhao | H04N 19/105 |
| 2022/0086426 | A1 | 3/2022 | Lee et al. | |
| 2022/0182616 | A1 * | 6/2022 | Li | H04N 19/105 |
| 2022/0201286 | A1 * | 6/2022 | Tsai | H04N 19/105 |
| 2022/0295116 | A1 * | 9/2022 | Ma | H04N 19/117 |
| 2023/0395089 | A1 * | 12/2023 | Ekstrand | G06N 3/0464 |

FOREIGN PATENT DOCUMENTS

| | | | |
|---|---|---|---|
| WO | 2015004877 | A1 | 1/2015 |
| WO | 2020060449 | A1 | 3/2020 |
| WO | 2020112768 | A1 | 6/2020 |
| WO | 2020216255 | A1 | 10/2020 |

OTHER PUBLICATIONS

International Search Report and Written Opinion in related PCT Application No. PCT/US2022/050696 dated Mar. 15, 2023 (9 pages).

Maria Santamaria et al., 'AHG11: Content-adaptive post-processing filter', Joint Video Experts Team (JVET) of ITU-T SG 16 WP 3 and ISO/IEC JTC 1/SC 29 25th Meeting, by teleconference, JVET-Y0059-v2, Jan. 11, 2022 [retrieved on Jun. 13, 2023]. Retrieved from: <URL: https://www.jvet-experts.org/doc_end_user/current_document.php?id=11253>.

Extended European Search Report in related European Application No. EP23775583.0 dated Feb. 26, 2026 (13 pages).

Extended European Search Report in related European Application No. 22896596.8, dated Oct. 23, 2025 (12 pages).

Ugur (Nokia) K et al: "Video coding technology proposal by Tandberg, Nokia, and Ericsson", 1. JCT-VC Meeting; Apr. 15, 2010-Apr. 23, 2010; Dresden; (Joint Collaborative Team on Video Coding of ISO/IEC JTC1/SC29/WG11 and ITU-T SG. 16 ), , No. JCTVC-A119 Apr. 12, 2010 (Apr. 12, 2010), XP030233027, Retrieved from the Internet: URL:http://phenix.intevry.fr/jct/doc_end_user/documents/1_Dresden/wg11/JCTVC-A119.zip JCTVC-A119. doc [retrieved on Mar. 19, 2012].

Wei Jiang et al: "Gradient based fast mode decision algorithm for intra prediction in HEVC".

Zhang Qiuwen et al: "Fast CU Partition and Intra Mode Decision Method for H.266/VVC", IEEE Access, IEEE, USA, vol. 8, Jun. 23, 2020 (Jun. 23, 2020), pp. 117539-117550, XP011797183, DOI: 10.1109/ACCESS.2020.3004580 [retrieved on Jul. 1, 2020].

* cited by examiner

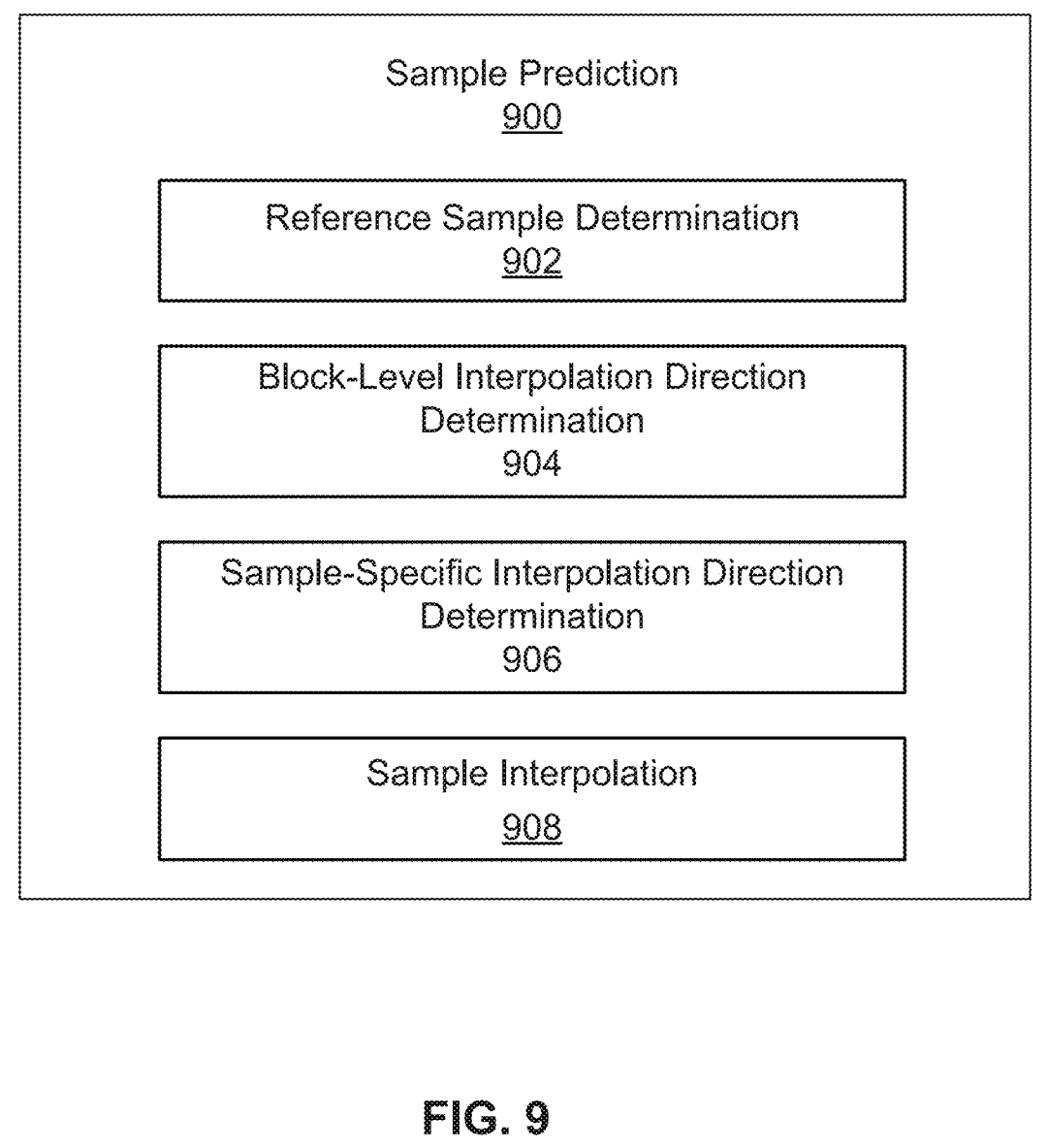

Sample Prediction
900

Reference Sample Determination
902

Block-Level Interpolation Direction Determination
904

Sample-Specific Interpolation Direction Determination
906

Sample Interpolation
908

FIG. 9

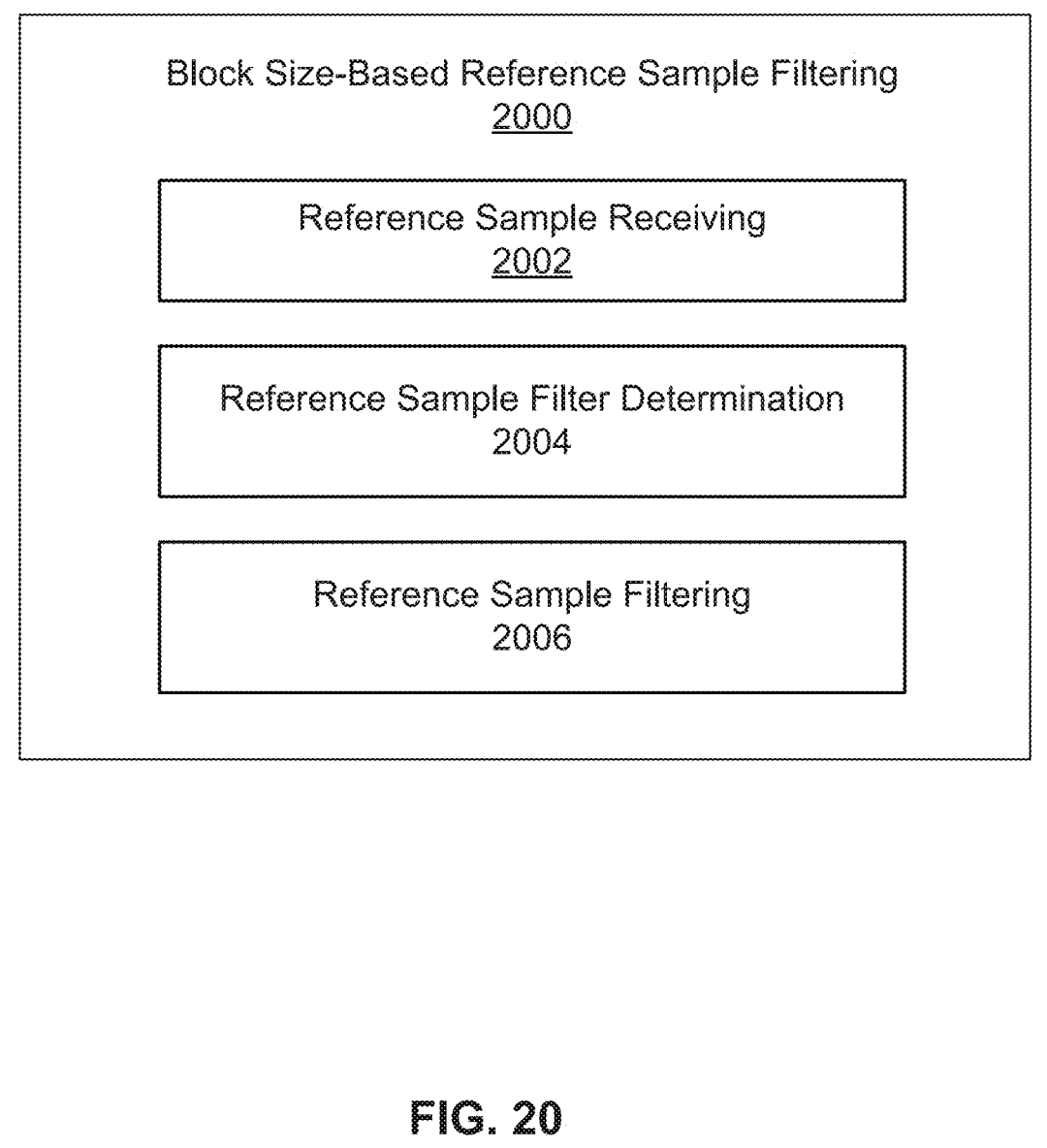

Block Size-Based Reference Sample Filtering
2000

Reference Sample Receiving
2002

Reference Sample Filter Determination
2004

Reference Sample Filtering
2006

FIG. 20

PLANAR MODE IMPROVEMENT FOR INTRA PREDICTION

CROSS-REFERENCE TO RELATED APPLICATIONS

This application is a continuation of PCT Application No. PCT/US2023/015869, filed Mar. 22, 2023, which is based upon and claims priority to U.S. Provisional Application No. 63/322,478, filed Mar. 22, 2022. This application is also a continuation-in-part of U.S. application Ser. No. 18/669,692, filed May 21, 2024, which is a bypass continuation of PCT Application No. PCT/US2022/050696, filed Nov. 22, 2022, which claims priority to U.S. Provisional Application No. 63/281,822, filed Nov. 22, 2021. The content of all above applications is incorporated herein by reference in their entirety.

TECHNICAL FIELD

This application is related to video coding and compression. More specifically, this application relates to video processing apparatuses and methods for intra prediction with reference sample filters.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. For example, video coding standards include Versatile Video Coding (VVC), Joint Exploration test Model (JEM), High-Efficiency Video Coding (HEVC/H.265), Advanced Video Coding (AVC/H.264), Moving Picture Expert Group (MPEG) coding, or the like. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

SUMMARY

Implementations of the disclosure provide a video processing apparatus and method for performing intra prediction on a video block. The video processing method may include receiving, by a processor, reference samples from a video frame of a video comprising the video block. The video processing method may further include determining, by the processor, a reference sample filter based on a size of each video block. The reference sample filter is among a plurality of reference sample filters each derived for a different video block size. The video processing method may also include applying, by the processor, the determined reference sample filter to the received reference samples. The video processing method may additionally include performing, by the processor, the intra prediction on the video block using the filtered reference samples.

Implementations of the present disclosure also provide a video processing apparatus for performing intra prediction on a video block. The video processing apparatus may include a memory and one or more processors coupled to the memory. The one or more processors may be configured to receive reference samples from a video frame of a video comprising the video block. The one or more processors may be further configured to determine a reference sample filter based on a size of each video block. The reference sample filter is among a plurality of reference sample filters each derived for a different video block size. The one or more processors may also be configured to apply the determined reference sample filter to the received reference samples. The one or more processors may also be configured to perform the intra prediction on the video block using the filtered reference samples.

Implementations of the present disclosure further provide a non-transitory computer-readable storage medium having stored therein instructions which, when executed by one or more processors, cause the one or more processors to perform a video processing method for performing intra prediction on a video block. The video processing method may include receiving reference samples from a video frame of a video comprising the video block. The video processing method may further include determining a reference sample filter based on a size of each video block. The reference sample filter is among a plurality of reference sample filters each derived for a different video block size. The video processing method may also include applying the determined reference sample filter to the received reference samples. The video processing method may additionally include performing the intra prediction on the video block using the filtered reference samples.

It is to be understood that both the foregoing general description and the following detailed description are examples only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 9 is a block diagram illustrating an exemplary sample prediction process in accordance with some implementations of the present disclosure.

FIG. 20 is a block diagram illustrating an exemplary block size-based reference sample filtering process in accordance with some implementations of the present disclosure.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

It should be illustrated that the terms "first," "second," and the like used in the description, claims of the present disclosure, and the accompanying drawings are used to distinguish objects, and not used to describe any specific order or sequence. It should be understood that the data used in this way may be interchanged under an appropriate condition, such that the embodiments of the present disclosure described herein may be implemented in orders besides those shown in the accompanying drawings or described in the present disclosure.

Figure 1:
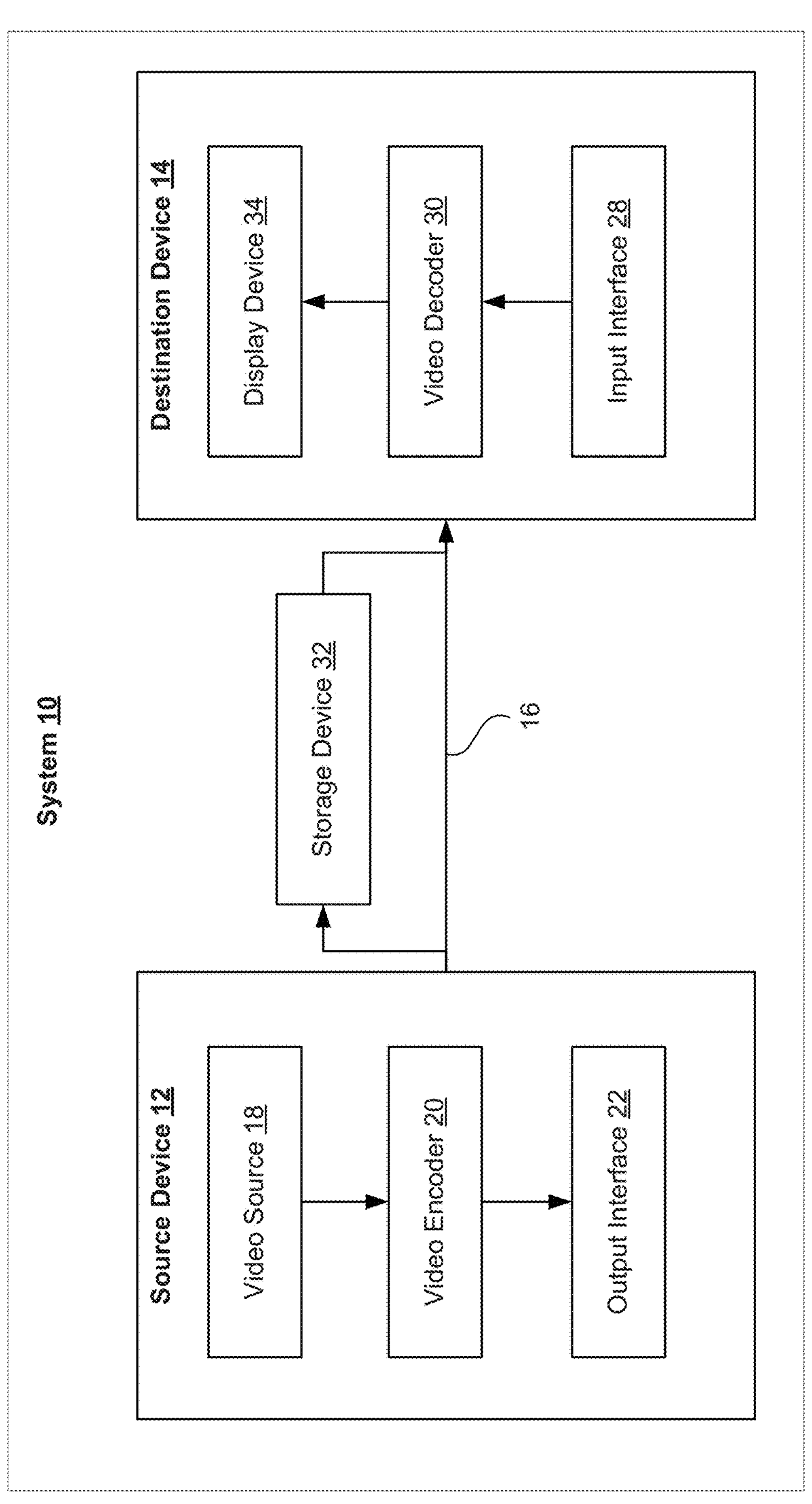
FIG. 1 is a block diagram illustrating an exemplary system for encoding and decoding video blocks in accordance with some implementations of the present disclosure.

FIG. 1 is a block diagram illustrating an exemplary system 10 for encoding and decoding video blocks in parallel in accordance with some implementations of the present disclosure. As shown in FIG. 1, the system 10 includes a source device 12 that generates and encodes video data to be decoded at a later time by a destination device 14. The source device 12 and the destination device 14 may include any of a wide variety of electronic devices, including desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may include any type of communication medium or device capable of forwarding the encoded video data from the source device 12 to the destination device 14. In one example, the link 16 may include a communication medium to enable the source device 12 to transmit the encoded video data directly to the destination device 14 in real time. The encoded video data may be modulated according to a communication standard, such as a wireless communication protocol, and transmitted to the destination device 14. The communication medium may include any wireless or wired communication medium, such as a Radio Frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, Digital Versatile Disks (DVDs), Compact Disc Read-Only Memories (CD-ROMs), flash memory, volatile or non-volatile memory, or any other suitable digital storage media for storing the encoded video data. In a further example, the storage device 32 may correspond to a file server or another intermediate storage device that may store the encoded video data generated by the source device 12. The destination device 14 may access the stored video data from the storage device 32 via streaming or downloading. The file server may be any type of computer capable of storing the encoded video data and transmitting the encoded video data to the destination device 14. Exemplary file servers include a web server (e.g., for a website), a File Transfer Protocol (FTP) server, Network Attached Storage (NAS) devices, or a local disk drive. The destination device 14 may access the encoded video data through any standard data connection, including a wireless channel (e.g., a Wireless Fidelity (Wi-Fi) connection), a wired connection (e.g., Digital Subscriber Line (DSL), cable modem, etc.), or any combination thereof that is suitable for accessing encoded video data stored on a file server. The transmission of the encoded video data from the storage device 32 may be a streaming transmission, a download transmission, or a combination of both.

As shown in FIG. 1, the source device 12 includes a video source 18, a video encoder 20, and the output interface 22. The video source 18 may include a source such as a video capturing device, e.g., a video camera, a video archive containing previously captured video, a video feeding interface to receive video data from a video content provider, and/or a computer graphics system for generating computer graphics data as the source video, or a combination of such sources. As one example, if the video source 18 is a video camera of a security surveillance system, the source device 12 and the destination device 14 may include camera phones or video phones. However, the implementations described in the present disclosure may be applicable to video coding in general, and may be applied to wireless and/or wired applications.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter.

The destination device 14 includes the input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a storage medium, or stored on a file server.

In some implementations, the destination device 14 may include the display device 34, which can be an integrated display device and an external display device that is configured to communicate with the destination device 14. The display device 34 displays the decoded video data for a user, and may include any of a variety of display devices such as a Liquid Crystal Display (LCD), a plasma display, an Organic Light Emitting Diode (OLED) display, or another type of display device.

The video encoder 20 and the video decoder 30 may operate according to proprietary or industry standards, such as VVC, HEVC, MPEG-4, Part 10, AVC, or extensions of such standards. It should be understood that the present disclosure is not limited to a specific video encoding/decoding standard and may be applicable to other video encoding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards.

The video encoder 20 and the video decoder 30 each may be implemented as any of a variety of suitable encoder and/or decoder circuitry, such as one or more microprocessors, Digital Signal Processors (DSPs), Application Specific Integrated Circuits (ASICs), Field Programmable Gate Arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video encoding/decoding operations disclosed in the present disclosure. Each of the video encoder 20 and the video decoder 30 may be included in one or more encoders or decoders, either of which may be integrated as part of a combined encoder/decoder (CODEC) in a respective device.

Figure 2:
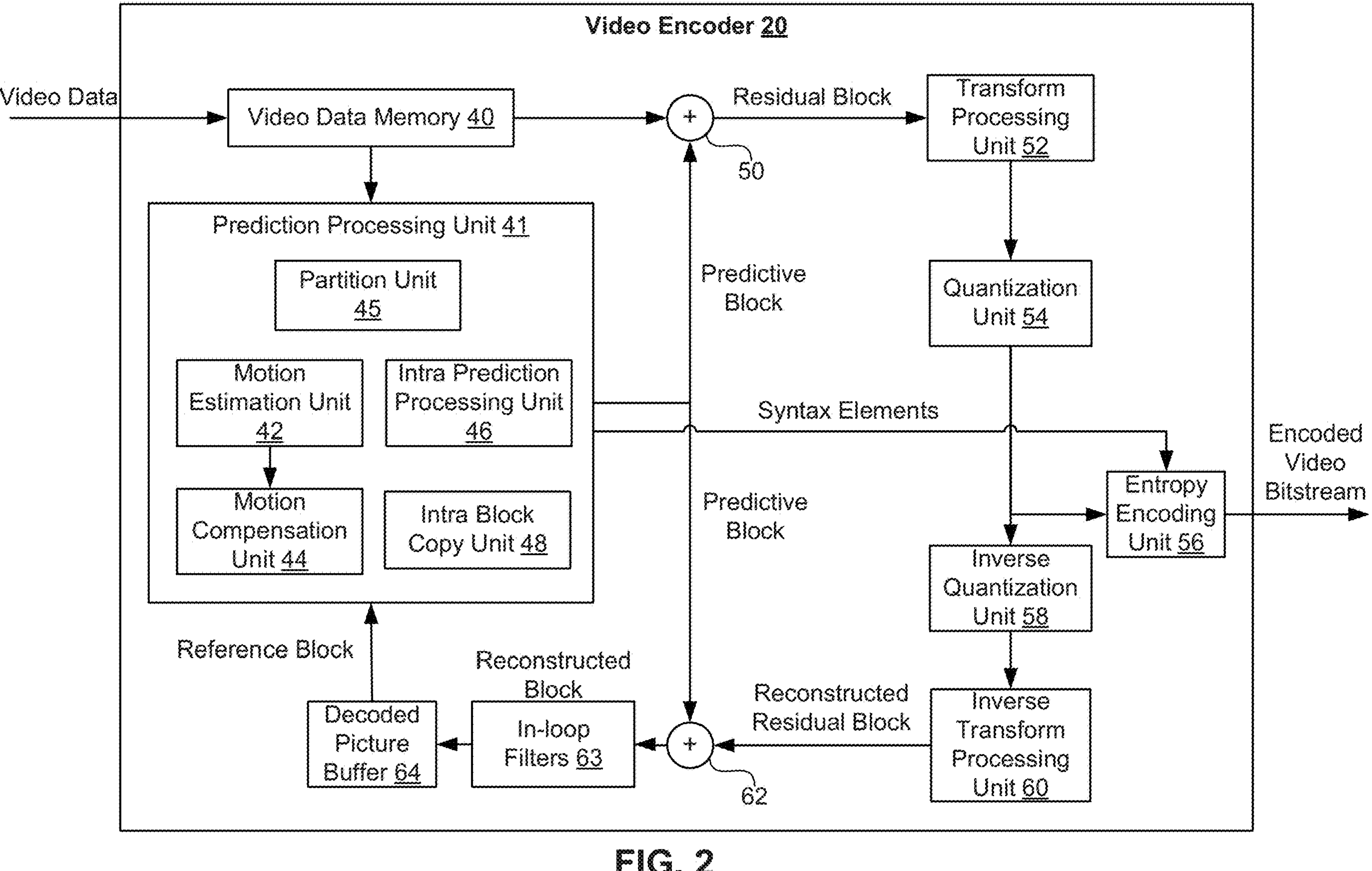
FIG. 2 is a block diagram illustrating an exemplary video encoder in accordance with some implementations of the present disclosure.

FIG. 2 is a block diagram illustrating an exemplary video encoder 20 in accordance with some implementations described in the present application. The video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence. It should be noted that the term "frame" may be used as synonyms for the term "image" or "picture" in the field of video coding.

As shown in FIG. 2, the video encoder 20 includes a video data memory 40, a prediction processing unit 41, a Decoded Picture Buffer (DPB) 64, a summer 50, a transform processing unit 52, a quantization unit 54, and an entropy encoding unit 56. The prediction processing unit 41 further includes a motion estimation unit 42, a motion compensation unit 44, a partition unit 45, an intra prediction processing unit 46, and an intra Block Copy (BC) unit 48. In some implementations, the video encoder 20 also includes an inverse quantization unit 58, an inverse transform processing unit 60, and a summer 62 for video block reconstruction. An in-loop filter 63, such as a deblocking filter, may be positioned between the summer 62 and the DPB 64 to filter block boundaries to remove block artifacts from reconstructed video data. Another in-loop filter, such as an SAO filter, Cross Component Sample Adaptive Offset (CCSAO) filter, and/or Adaptive in-Loop Filter (ALF), may also be used in addition to the deblocking filter to filter an output of the summer 62. It should be illustrated that for the CCSAO technique, the present application is not limited to the embodiments described herein, and instead, the application may be applied to a situation where an offset is selected for any of a luma component, a Cb chroma component and a Cr chroma component according to any other of the luma component, the Cb chroma component and the Cr chroma component to modify said any component based on the selected offset. Further, it should also be illustrated that a first component mentioned herein may be any of the luma component, the Cb chroma component and the Cr chroma component, a second component mentioned herein may be any other of the luma component, the Cb chroma component and the Cr chroma component, and a third component mentioned herein may be a remaining one of the luma component, the Cb chroma component and the Cr chroma component. In some examples, the in-loop filters may be omitted, and the decoded video block may be directly provided by the summer 62 to the DPB 64. The video encoder 20 may take the form of a fixed or programmable hardware unit or may be divided among one or more of the illustrated fixed or programmable hardware units.

The video data memory 40 may store video data to be encoded by the components of the video encoder 20. The video data in the video data memory 40 may be obtained, for example, from the video source 18 as shown in FIG. 1. The DPB 64 is a buffer that stores reference video data (for example, reference frames or pictures) for use in encoding video data by the video encoder 20 (e.g., in intra or inter predictive coding modes). The video data memory 40 and the DPB 64 may be formed by any of a variety of memory devices. In various examples, the video data memory 40 may be on-chip with other components of the video encoder 20, or off-chip relative to those components.

As shown in FIG. 2, after receiving the video data, the partition unit 45 within the prediction processing unit 41 partitions the video data into video blocks. This partitioning may also include partitioning a video frame into slices, tiles (for example, sets of video blocks), or other larger Coding Units (CUs) according to predefined splitting structures such as a Quad-Tree (QT) structure associated with the video data. The video frame is or may be regarded as a two-dimensional array or matrix of samples with sample values. A sample in the array may also be referred to as a pixel or a pel. A number of samples in horizontal and vertical directions (or axes) of the array or picture define a size and/or a resolution of the video frame. The video frame may be divided into multiple video blocks by, for example, using QT partitioning. The video block again is or may be regarded as a two-dimensional array or matrix of samples with sample values, although of smaller dimension than the video frame. A number of samples in horizontal and vertical directions (or axes) of the video block define a size of the video block. The video block may further be partitioned into one or more block partitions or sub-blocks (which may form again blocks) by, for example, iteratively using QT partitioning, Binary-Tree (BT) partitioning, Triple-Tree (TT) partitioning or any combination thereof. It should be noted that the term "block" or "video block" as used herein may be a portion, in particular a rectangular (square or non-square) portion, of a frame or a picture. With reference to, for example, HEVC and VVC, the block or video block may be or correspond to a Coding Tree Unit (CTU), a CU, a Prediction Unit (PU), or a Transform Unit (TU), and/or may be or correspond to a corresponding block, e.g., a Coding Tree Block (CTB), a Coding Block (CB), a Prediction Block (PB), or a Transform Block (TB). Alternatively or additionally, the block or video block may be or correspond to a sub-block of a CTB, a CB, a PB, a TB, etc.

The prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). The prediction processing unit 41 may provide the resulting intra or inter prediction coded block (e.g., a predictive block) to the summer 50 to generate a residual block and to the summer 62 to reconstruct the encoded block for use as part of a reference frame subsequently. The prediction processing unit 41 also provides syntax elements, such as motion vectors, intra-mode indicators, partition information, and other such syntax information to the entropy encoding unit 56.

In order to select an appropriate intra predictive coding mode for the current video block, the intra prediction processing unit 46 within the prediction processing unit 41 may perform intra predictive coding of the current video block relative to one or more neighbor blocks in the same frame as the current block to be coded to provide spatial prediction. The motion estimation unit 42 and the motion compensation unit 44 within the prediction processing unit 41 perform inter predictive coding of the current video block relative to one or more predictive blocks in one or more reference frames to provide temporal prediction. The video encoder 20 may perform multiple coding passes, e.g., to select an appropriate coding mode for each block of video data.

In some implementations, the motion estimation unit 42 determines the inter prediction mode for a current video frame by generating a motion vector, which indicates the displacement of a video block within the current video frame relative to a predictive block within a reference frame, according to a predetermined pattern within a sequence of video frames. Motion estimation, performed by the motion estimation unit 42, may be a process of generating motion vectors, which may estimate motion for video blocks. A motion vector, for example, may indicate the displacement of a video block within a current video frame or picture relative to a predictive block within a reference frame. The predetermined pattern may designate video frames in the sequence as P frames or B frames. The intra BC unit 48 may determine vectors, e.g., block vectors, for intra BC coding in a manner similar to the determination of motion vectors by the motion estimation unit 42 for inter prediction, or may utilize the motion estimation unit 42 to determine the block vectors.

A predictive block for the video block may be or may correspond to a block or a reference block of a reference frame that is deemed as closely matching the video block to be coded in terms of pixel difference, which may be determined by Sum of Absolute Difference (SAD), Sum of Square Difference (SSD), or other difference metrics. In some implementations, the video encoder 20 may calculate values for sub-integer pixel positions of reference frames stored in the DPB 64. For example, the video encoder 20 may interpolate values of one-quarter pixel positions, one-eighth pixel positions, or other fractional pixel positions of the reference frame. Therefore, the motion estimation unit 42 may perform a motion search relative to the full pixel positions and fractional pixel positions and output a motion vector with fractional pixel precision.

The motion estimation unit 42 calculates a motion vector for a video block in an inter prediction coded frame by comparing the position of the video block to the position of a predictive block of a reference frame selected from a first reference frame list (List 0) or a second reference frame list (List 1), each of which identifies one or more reference frames stored in the DPB 64. The motion estimation unit 42 sends the calculated motion vector to the motion compensation unit 44 and then to the entropy encoding unit 56.

Motion compensation, performed by the motion compensation unit 44, may involve fetching or generating the predictive block based on the motion vector determined by the motion estimation unit 42. Upon receiving the motion vector for the current video block, the motion compensation unit 44 may locate a predictive block to which the motion vector points in one of the reference frame lists, retrieve the predictive block from the DPB 64, and forward the predictive block to the summer 50. The summer 50 then forms a residual block of pixel difference values by subtracting pixel values of the predictive block provided by the motion compensation unit 44 from the pixel values of the current video block being coded. The pixel difference values forming the residual block may include luma or chroma component differences or both. The motion compensation unit 44 may also generate syntax elements associated with the video blocks of a video frame for use by the video decoder 30 in decoding the video blocks of the video frame. The syntax elements may include, for example, syntax elements defining the motion vector used to identify the predictive block, any flags indicating the prediction mode, or any other syntax information described herein. It is noted that the motion estimation unit 42 and the motion compensation unit 44 may be integrated together, which are illustrated separately for conceptual purposes in FIG. 2.

In some implementations, the intra BC unit 48 may generate vectors and fetch predictive blocks in a manner similar to that described above in connection with the motion estimation unit 42 and the motion compensation unit 44, but with the predictive blocks being in the same frame as the current block being coded and with the vectors being referred to as block vectors as opposed to motion vectors. In particular, the intra BC unit 48 may determine an intra-prediction mode to use to encode a current block. In some examples, the intra BC unit 48 may encode a current block using various intra-prediction modes, e.g., during separate encoding passes, and test their performance through rate-distortion analysis. Next, the intra BC unit 48 may select, among the various tested intra-prediction modes, an appropriate intra-prediction mode to use and generate an intra-mode indicator accordingly. For example, the intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, the intra BC unit 48 may use the motion estimation unit 42 and the motion compensation unit 44, in whole or in part, to perform such functions for Intra BC prediction according to the implementations described herein. In either case, for intra block copy, a predictive block may be a block that is deemed as closely matching the block to be coded, in terms of pixel difference, which may be determined by SAD, SSD, or other difference metrics, and identification of the predictive block may include calculation of values for sub-integer pixel positions.

Whether the predictive block is from the same frame according to intra prediction, or from a different frame according to inter prediction, the video encoder 20 may form a residual block by subtracting pixel values of the predictive block from the pixel values of the current video block being coded, forming pixel difference values. The pixel difference values forming the residual block may include both luma and chroma component differences.

The intra prediction processing unit 46 may intra-predict a current video block, as an alternative to the inter-prediction performed by the motion estimation unit 42 and the motion compensation unit 44, or the intra block copy prediction performed by the intra BC unit 48, as described above. In particular, the intra prediction processing unit 46 may determine an intra prediction mode to use to encode a current block. For example, the intra prediction processing unit 46 may encode a current block using various intra prediction modes, e.g., during separate encoding passes, and the intra prediction processing unit 46 (or a mode selection unit, in some examples) may select an appropriate intra prediction mode to use from the tested intra prediction modes. The intra prediction processing unit 46 may provide information indicative of the selected intra-prediction mode for the block to the entropy encoding unit 56. The entropy encoding unit 56 may encode the information indicating the selected intra-prediction mode in a bitstream.

After the prediction processing unit 41 determines the predictive block for the current video block via either inter prediction or intra prediction, the summer 50 forms a residual block by subtracting the predictive block from the current video block. The residual video data in the residual block may be included in one or more TUs and is provided to the transform processing unit 52. The transform processing unit 52 transforms the residual video data into transform coefficients using a transform, such as a Discrete Cosine Transform (DCT) or a conceptually similar transform.

The transform processing unit 52 may send the resulting transform coefficients to the quantization unit 54. The quantization unit 54 quantizes the transform coefficients to further reduce the bit rate. The quantization process may also reduce the bit depth associated with some or all of the coefficients. The degree of quantization may be modified by adjusting a quantization parameter. In some examples, the quantization unit 54 may then perform a scan of a matrix including the quantized transform coefficients. Alternatively, the entropy encoding unit 56 may perform the scan.

Following quantization, the entropy encoding unit 56 may use an entropy encoding technique to encode the quantized transform coefficients into a video bitstream, e.g., using Context Adaptive Variable Length Coding (CAVLC), Context Adaptive Binary Arithmetic Coding (CABAC), Syntax-based context-adaptive Binary Arithmetic Coding (SBAC), Probability Interval Partitioning Entropy (PIPE) coding, or another entropy encoding methodology or technique. The encoded bitstream may then be transmitted to the video decoder 30 as shown in FIG. 1 or archived in the storage device 32 as shown in FIG. 1 for later transmission to or retrieval by the video decoder 30. The entropy encoding unit 56 may also use an entropy encoding technique to encode the motion vectors and the other syntax elements for the current video frame being coded.

The inverse quantization unit 58 and the inverse transform processing unit 60 apply inverse quantization and inverse transformation, respectively, to reconstruct the residual block in the pixel domain for generating a reference block for prediction of other video blocks. A reconstructed residual block may be generated thereof. As noted above, the motion compensation unit 44 may generate a motion compensated predictive block from one or more reference blocks of the frames stored in the DPB 64. The motion compensation unit 44 may also apply one or more interpolation filters to the predictive block to calculate sub-integer pixel values for use in motion estimation.

The summer 62 adds the reconstructed residual block to the motion compensated predictive block produced by the motion compensation unit 44 to produce a reference block for storage in the DPB 64. The reference block may then be used by the intra BC unit 48, the motion estimation unit 42, and the motion compensation unit 44 as a predictive block to inter predict another video block in a subsequent video frame.

Figure 3:
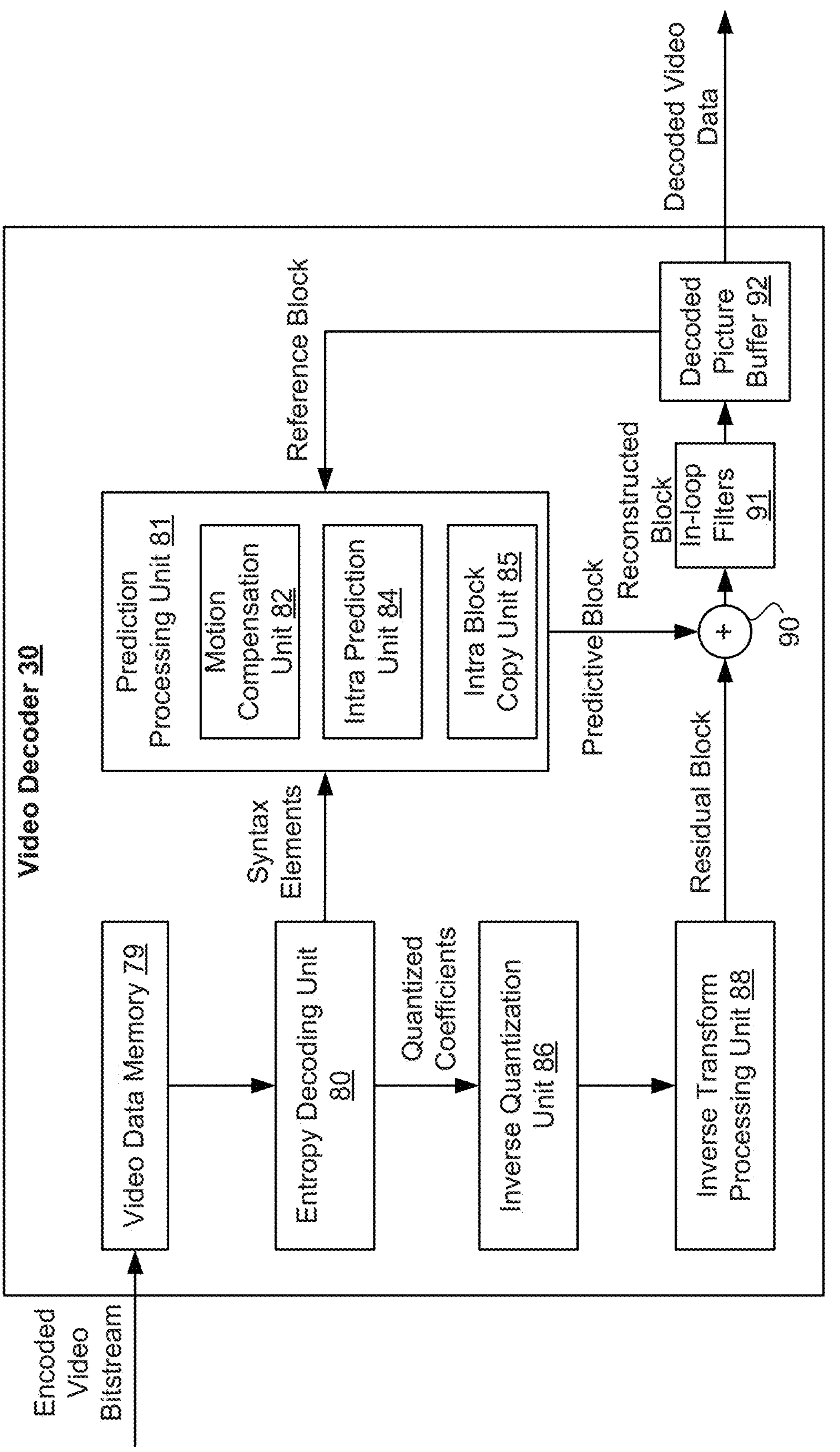
FIG. 3 is a block diagram illustrating an exemplary video decoder in accordance with some implementations of the present disclosure.

FIG. 3 is a block diagram illustrating an exemplary video decoder 30 in accordance with some implementations of the present application. The video decoder 30 includes a video data memory 79, an entropy decoding unit 80, a prediction processing unit 81, an inverse quantization unit 86, an inverse transform processing unit 88, a summer 90, and a DPB 92. The prediction processing unit 81 further includes a motion compensation unit 82, an intra prediction unit 84, and an intra BC unit 85. The video decoder 30 may perform a decoding process generally reciprocal to the encoding process described above with respect to the video encoder 20 in connection with FIG. 2. For example, the motion compensation unit 82 may generate prediction data based on motion vectors received from the entropy decoding unit 80, while the intra prediction unit 84 may generate prediction data based on intra-prediction mode indicators received from the entropy decoding unit 80.

In some examples, a unit of the video decoder 30 may be tasked to perform the implementations of the present application. Also, in some examples, the implementations of the present disclosure may be divided among one or more of the units of the video decoder 30. For example, the intra BC unit 85 may perform the implementations of the present application, alone, or in combination with other units of the video decoder 30, such as the motion compensation unit 82, the intra prediction unit 84, and the entropy decoding unit 80. In some examples, the video decoder 30 may not include the intra BC unit 85 and the functionality of intra BC unit 85 may be performed by other components of the prediction processing unit 81, such as the motion compensation unit 82.

The video data memory 79 may store video data, such as an encoded video bitstream, to be decoded by the other components of the video decoder 30. The video data stored in the video data memory 79 may be obtained, for example, from the storage device 32, from a local video source, such as a camera, via wired or wireless network communication of video data, or by accessing physical data storage media (e.g., a flash drive or hard disk). The video data memory 79 may include a Coded Picture Buffer (CPB) that stores encoded video data from an encoded video bitstream. The DPB 92 of the video decoder 30 stores reference video data for use in decoding video data by the video decoder 30 (e.g., in intra or inter predictive coding modes). The video data memory 79 and the DPB 92 may be formed by any of a variety of memory devices, such as dynamic random access memory (DRAM), including Synchronous DRAM (SDRAM), Magneto-resistive RAM (MRAM), Resistive RAM (RRAM), or other types of memory devices. For illustrative purposes, the video data memory 79 and the DPB 92 are depicted as two distinct components of the video decoder 30 in FIG. 3. But it will be apparent to one skilled in the art that the video data memory 79 and the DPB 92 may be provided by the same memory device or separate memory devices. In some examples, the video data memory 79 may be on-chip with other components of the video decoder 30, or off-chip relative to those components.

During the decoding process, the video decoder 30 receives an encoded video bitstream that represents video blocks of an encoded video frame and associated syntax elements. The video decoder 30 may receive the syntax elements at the video frame level and/or the video block level. The entropy decoding unit 80 of the video decoder 30 may use an entropy decoding technique to decode the bitstream to obtain quantized coefficients, motion vectors or intra-prediction mode indicators, and other syntax elements. The entropy decoding unit 80 then forwards the motion vectors or intra-prediction mode indicators and other syntax elements to the prediction processing unit 81.

When the video frame is coded as an intra predictive coded (e.g., I) frame or for intra coded predictive blocks in other types of frames, the intra prediction unit 84 of the prediction processing unit 81 may generate prediction data for a video block of the current video frame based on a signaled intra-prediction mode and reference data from previously decoded blocks of the current frame.

When the video frame is coded as an inter-predictive coded (i.e., B or P) frame, the motion compensation unit 82 of the prediction processing unit 81 produces one or more predictive blocks for a video block of the current video frame based on the motion vectors and other syntax elements received from the entropy decoding unit 80. Each of the predictive blocks may be produced from a reference frame within one of the reference frame lists. The video decoder 30 may construct the reference frame lists, e.g., List 0 and List 1, using default construction techniques based on reference frames stored in the DPB 92.

In some examples, when the video block is coded according to the intra BC mode described herein, the intra BC unit 85 of the prediction processing unit 81 produces predictive blocks for the current video block based on block vectors and other syntax elements received from the entropy decoding unit 80. The predictive blocks may be within a reconstructed region of the same picture as the current video block processed by the video encoder 20.

The motion compensation unit 82 and/or the intra BC unit 85 determines prediction information for a video block of the current video frame by parsing the motion vectors and other syntax elements, and then uses the prediction information to produce the predictive blocks for the current video block being decoded. For example, the motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, the intra BC unit 85 may use some of the received syntax elements, e.g., a flag, to determine that the current video block was predicted using the intra BC mode, construction information of which video blocks of the frame are within the reconstructed region and should be stored in the DPB 92, block vectors for each intra BC predicted video block of the frame, intra BC prediction status for each intra BC predicted video block of the frame, and other information to decode the video blocks in the current video frame.

The motion compensation unit 82 may also perform interpolation using the interpolation filters as used by the video encoder 20 during encoding of the video blocks to calculate interpolated values for sub-integer pixels of reference blocks. In this case, the motion compensation unit 82 may determine the interpolation filters used by the video encoder 20 from the received syntax elements and use the interpolation filters to produce predictive blocks.

The inverse quantization unit 86 inversely quantizes the quantized transform coefficients provided in the bitstream and decoded by the entropy decoding unit 80 using the same quantization parameter calculated by the video encoder 20 for each video block in the video frame to determine a degree of quantization. The inverse transform processing unit 88 applies an inverse transform, e.g., an inverse DCT, an inverse integer transform, or a conceptually similar inverse transform process, to the transform coefficients in order to reconstruct the residual blocks in the pixel domain.

After the motion compensation unit 82 or the intra BC unit 85 generates the predictive block for the current video block based on the vectors and other syntax elements, the summer 90 reconstructs a decoded video block for the current video block by summing the residual block from the inverse transform processing unit 88 and a corresponding predictive block generated by the motion compensation unit 82 and the intra BC unit 85. The decoded video block may also be referred to as a reconstructed block for the current video block. An in-loop filter 91 such as a deblocking filter, SAO filter, CCSAO filter, and/or ALF may be positioned between the summer 90 and the DPB 92 to further process the decoded video block. In some examples, the in-loop filter 91 may be omitted, and the decoded video block may be directly provided by the summer 90 to the DPB 92. The decoded video blocks in a given frame are then stored in the DPB 92, which stores reference frames used for subsequent motion compensation of next video blocks. The DPB 92, or a memory device separate from the DPB 92, may also store decoded video for later presentation on a display device, such as the display device 34 of FIG. 1.

In a typical video coding process (e.g., including a video encoding process and a video decoding process), a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCris a two-dimensional array of Cr chroma samples. In other instances, a frame may be monochrome and therefore includes only one two-dimensional array of luma samples.

Figure 4A:
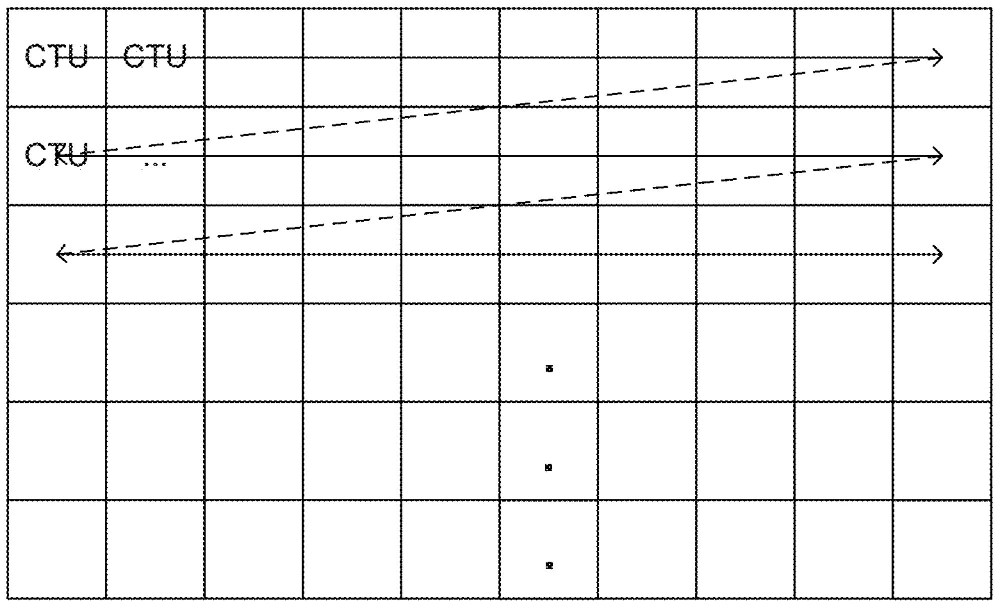
FIGS. 4A through 4E are graphical representations illustrating how a frame is recursively partitioned into multiple video blocks of different sizes and shapes in accordance with some implementations of the present disclosure.
Figure 4B:
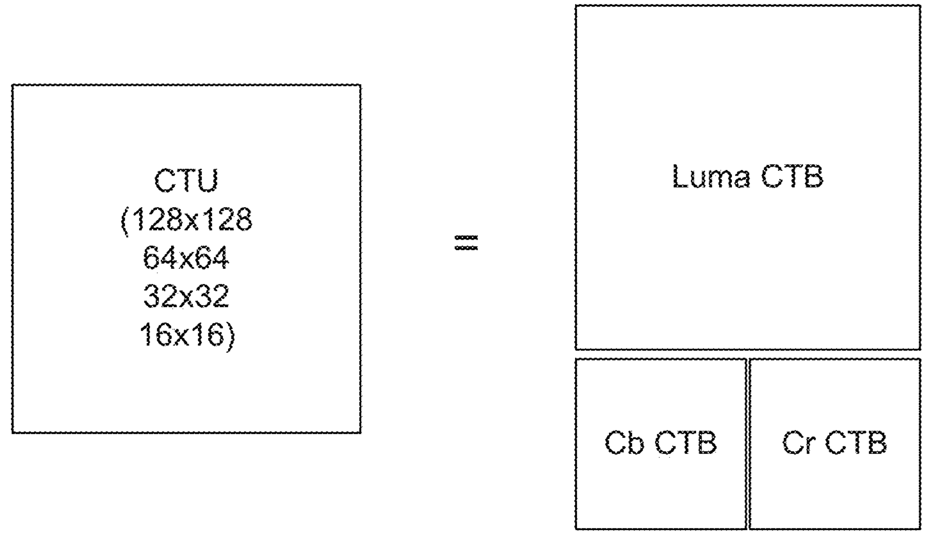

As shown in FIG. 4A, the video encoder 20 (or more specifically the partition unit 45) generates an encoded representation of a frame by first partitioning the frame into a set of CTUs. A video frame may include an integer number of CTUs arranged consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that a CTU in the present disclosure is not necessarily limited to a particular size. As shown in FIG. 4B, each CTU may include one CTB of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra-prediction mode, motion vectors, and other parameters. In monochrome pictures or pictures having three separate color planes, a CTU may include a single coding tree block and syntax elements used to code the samples of the coding tree block. A coding tree block may be an N×N block of samples.

To achieve a better performance, the video encoder 20 may recursively perform tree partitioning such as binary-tree partitioning, ternary-tree partitioning, quad-tree partitioning or a combination thereof on the coding tree blocks of the CTU and divide the CTU into smaller CUs.

Figure 4C:
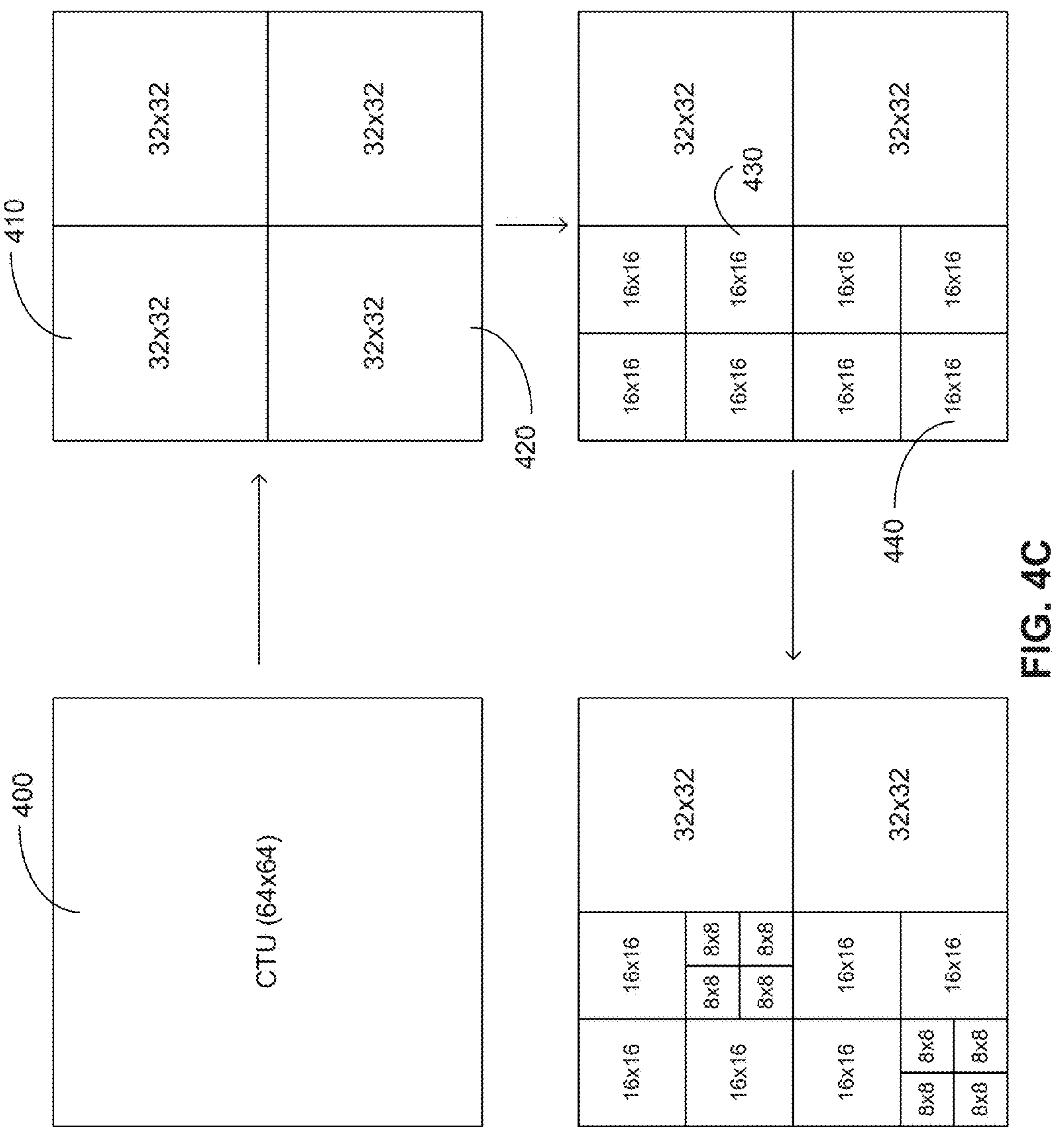
Figure 4D:
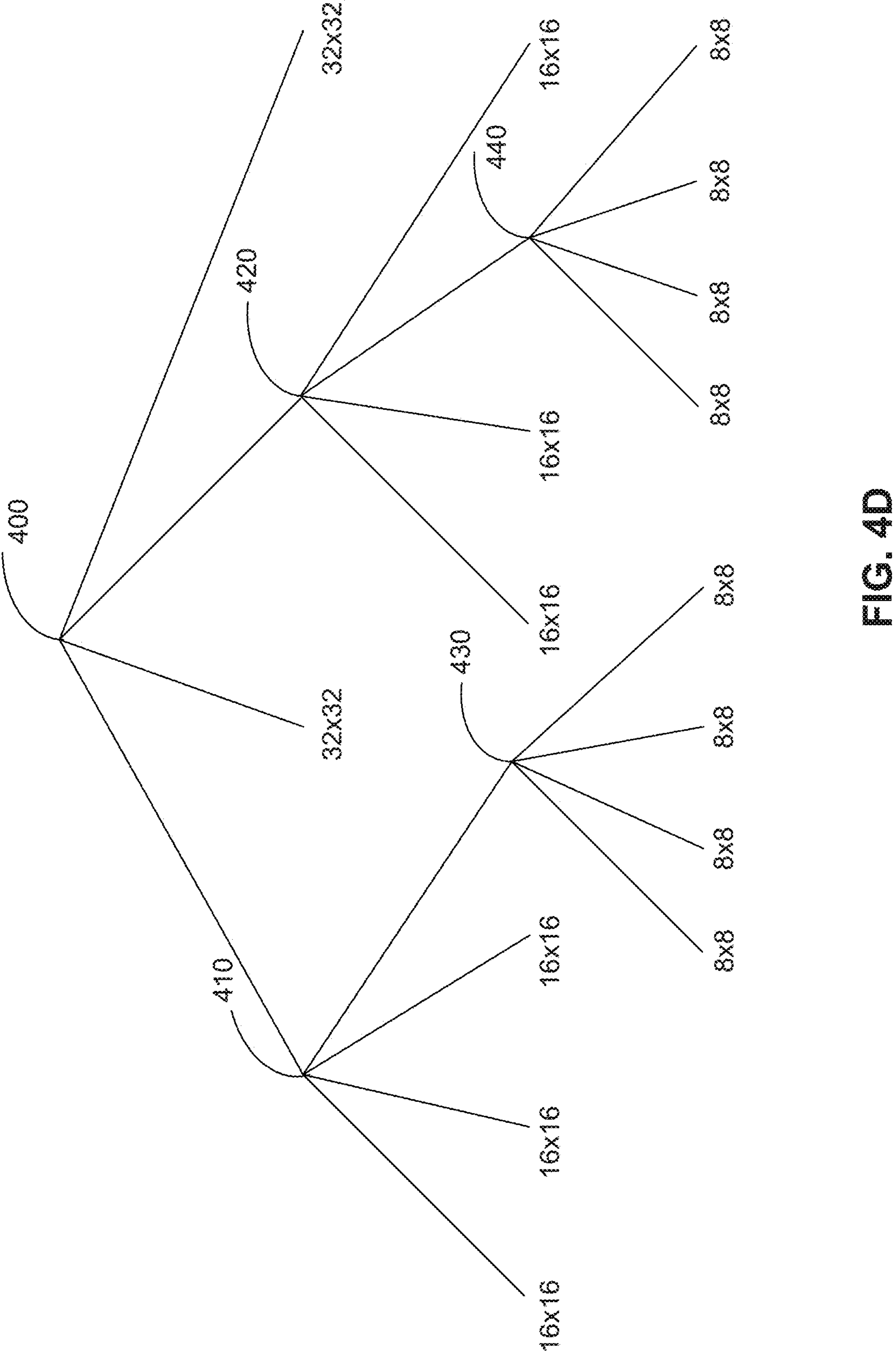
Figure 4E:
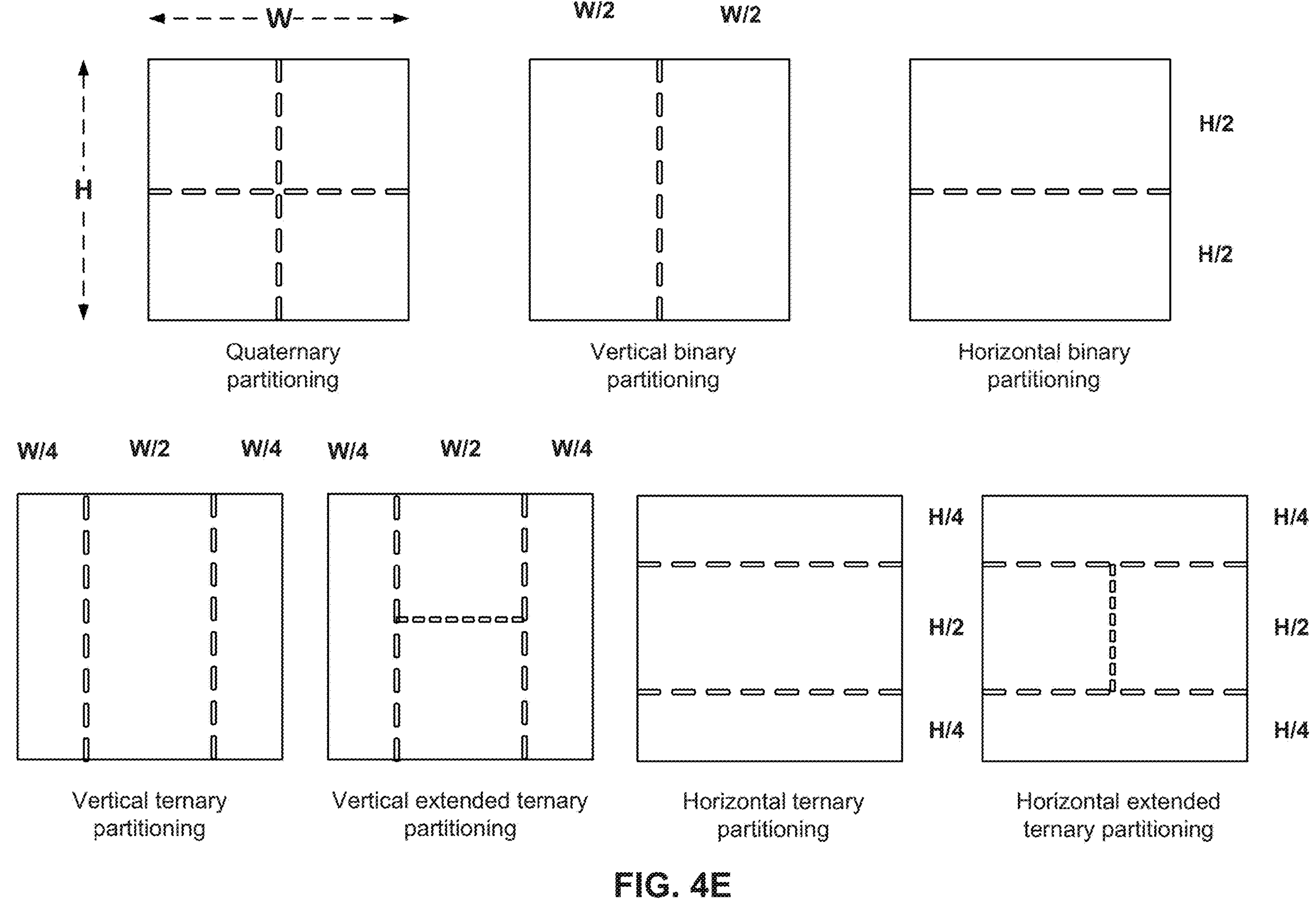

As depicted in FIG. 4C, the 64×64 CTU 400 is first divided into four smaller CUs, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may include a CB of luma samples and two corresponding coding blocks of chroma samples of a frame of the same size, and syntax elements used to code the samples of the coding blocks. In monochrome pictures or pictures having three separate colour planes, a CU may include a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are multiple possible partitioning types of a coding block having a width W and a height H, i.e., quaternary partitioning, vertical binary partitioning, horizontal binary partitioning, vertical ternary partitioning, vertical extended ternary partitioning, horizontal ternary partitioning, and horizontal extended ternary partitioning.

In some implementations, the video encoder 20 may further partition a coding block of a CU into one or more M×N PBs. A PB may include a rectangular (square or non-square) block of samples on which the same prediction, inter or intra, is applied. A PU of a CU may include a PB of luma samples, two corresponding PBs of chroma samples, and syntax elements used to predict the PBs. In monochrome pictures or pictures having three separate color planes, a PU may include a single PB and syntax structures used to predict the PB. The video encoder 20 may generate predictive luma, Cb, and Cr blocks for luma, Cb, and Cr PBs of each PU of the CU.

The video encoder 20 may use intra prediction or inter prediction to generate the predictive blocks for a PU. If the video encoder 20 uses intra prediction to generate the predictive blocks of a PU, the video encoder 20 may generate the predictive blocks of the PU based on decoded samples of the frame associated with the PU. If the video encoder 20 uses inter prediction to generate the predictive blocks of a PU, the video encoder 20 may generate the predictive blocks of the PU based on decoded samples of one or more frames other than the frame associated with the PU.

After the video encoder 20 generates predictive luma, Cb, and Cr blocks for one or more PUs of a CU, the video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, the video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block, and each sample in the CU's Cr residual block may indicate a difference between a Cr sample in one of the CU's predictive Cr blocks and a corresponding sample in the CU's original Cr coding block.

Furthermore, as illustrated in FIG. 4C, video encoder 20 may use quad-tree partitioning to decompose the luma, Cb, and Cr residual blocks of a CU into one or more luma, Cb, and Cr transform blocks respectively. A transform block may include a rectangular (square or non-square) block of samples on which the same transform is applied. A TU of a CU may include a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may include a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. The video encoder 20 may apply one or more transforms to a Cb transform block of a TU to generate a Cb coefficient block for the TU. The video encoder 20 may apply one or more transforms to a Cr transform block of a TU to generate a Cr coefficient block for the TU.

After generating a coefficient block (e.g., a luma coefficient block, a Cb coefficient block, or a Cr coefficient block), the video encoder 20 may quantize the coefficient block. Quantization generally refers to a process in which transform coefficients are quantized to possibly reduce the amount of data used to represent the transform coefficients, providing further compression. After the video encoder 20 quantizes a coefficient block, the video encoder 20 may apply an entropy encoding technique to encode syntax elements indicating the quantized transform coefficients. For example, the video encoder 20 may perform CABAC on the syntax elements indicating the quantized transform coefficients. Finally, the video encoder 20 may output a bitstream that includes a sequence of bits that form a representation of coded frames and associated data, which is either saved in the storage device 32 or transmitted to the destination device 14.

After receiving a bitstream generated by the video encoder 20, the video decoder 30 may parse the bitstream to obtain syntax elements from the bitstream. The video decoder 30 may reconstruct the frames of the video data based at least in part on the syntax elements obtained from the bitstream. The process of reconstructing the video data is generally reciprocal to the encoding process performed by the video encoder 20. For example, the video decoder 30 may perform inverse transforms on the coefficient blocks associated with TUs of a current CU to reconstruct residual blocks associated with the TUs of the current CU. The video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). It is noted that Intra Block Copy (IBC) could be regarded as either intra-frame prediction or a third mode. Between the two modes, inter-frame prediction contributes more to the coding efficiency than intra-frame prediction because of the use of motion vectors for predicting a current video block from a reference video block.

But with the ever-improving video data capturing technology and more refined video block size for preserving details in the video data, the amount of data required for representing motion vectors for a current frame also increases substantially. One way of overcoming this challenge is to benefit from the fact that not only a group of neighboring CUs in both the spatial and temporal domains have similar video data for predicting purpose but the motion vectors between these neighboring CUs are also similar. Therefore, it is possible to use the motion information of spatially neighboring CUs and/or temporally co-located CUs as an approximation of the motion information (e.g., motion vector) of a current CU by exploring their spatial and temporal correlation, which is also referred to as "Motion Vector Predictor (MVP)" of the current CU.

Instead of encoding an actual motion vector of the current CU into the video bitstream (e.g., the actual motion vector being determined by the motion estimation unit 42 as described above in connection with FIG. 2), the motion vector predictor of the current CU is subtracted from the actual motion vector of the current CU to produce a Motion Vector Difference (MVD) for the current CU. By doing so, there is no need to encode the motion vector determined by the motion estimation unit 42 for each CU of a frame into the video bitstream, and the amount of data used for representing motion information in the video bitstream can be significantly decreased.

Like the process of choosing a predictive block in a reference frame during inter-frame prediction of a code block, a set of rules can be adopted by both the video encoder 20 and the video decoder 30 for constructing a motion vector candidate list (also known as a "merge list") for a current CU using those potential candidate motion vectors associated with spatially neighboring CUs and/or temporally co-located CUs of the current CU and then selecting one member from the motion vector candidate list as a motion vector predictor for the current CU. By doing so, there is no need to transmit the motion vector candidate list itself from the video encoder 20 to the video decoder 30, and an index of the selected motion vector predictor within the motion vector candidate list is sufficient for the video encoder 20 and the video decoder 30 to use the same motion vector predictor within the motion vector candidate list for encoding and decoding the current CU. Thus, only the index of the selected motion vector predictor needs to be sent from the video encoder 20 to the video decoder 30.

A brief description for CTU partitioning in Enhanced Compression Model (ECM) is provided herein. In HEVC, a CTU can be split into CUs by using a quaternary-tree structure (denoted as a coding tree) to adapt to various local characteristics. A decision whether to code a picture area using inter-picture (temporal) or intra-picture (spatial) prediction can be made at the leaf CU level. Each leaf CU can be further split into one, two, or four PUs according to a PU splitting type. Within each PU, the same prediction process can be applied, and the relevant information can be transmitted to the video decoder 30 on a PU basis. After obtaining a residual block by applying the prediction process based on the PU splitting type, the leaf CU can be partitioned into transform units (TUs) according to another quaternary-tree structure similar to the coding tree for the CU. A feature of the HEVC structure includes that it has multiple partition unit concepts such as CU, PU, and TU.

In VVC, a quadtree with a nested multi-type tree using a binary-split or ternary-split structure replaces the concepts of the multiple partition unit types (e.g., CU, PU, TU) in HEVC. For example, in VCC the separation of the CU, PU, and TU concepts is removed except as needed for CUs that have a size too large for the maximum transform length, thereby supporting a higher flexibility for CU partition shapes. In the coding tree structure, a CU can have either a square or rectangular shape. A CTU is first partitioned by a quaternary tree (a.k.a. quadtree) structure. Then, the quaternary tree leaf nodes can be further partitioned by a multi-type tree structure. As shown in FIG. 4E, there are various splitting types in the multi-type tree structure, including vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are referred to as CUs. Unless a CU is too large for the maximum transform length, this segmentation with the multi-type tree structure is used for prediction and transform processing without any further partitioning. This means that, in most cases, the CU, PU, and TU have the same block size in the quadtree with the nested multi-type tree coding block structure. An exception occurs when the supported maximum transform length is smaller than a width or height of the color component of the CU.

Figure 5:
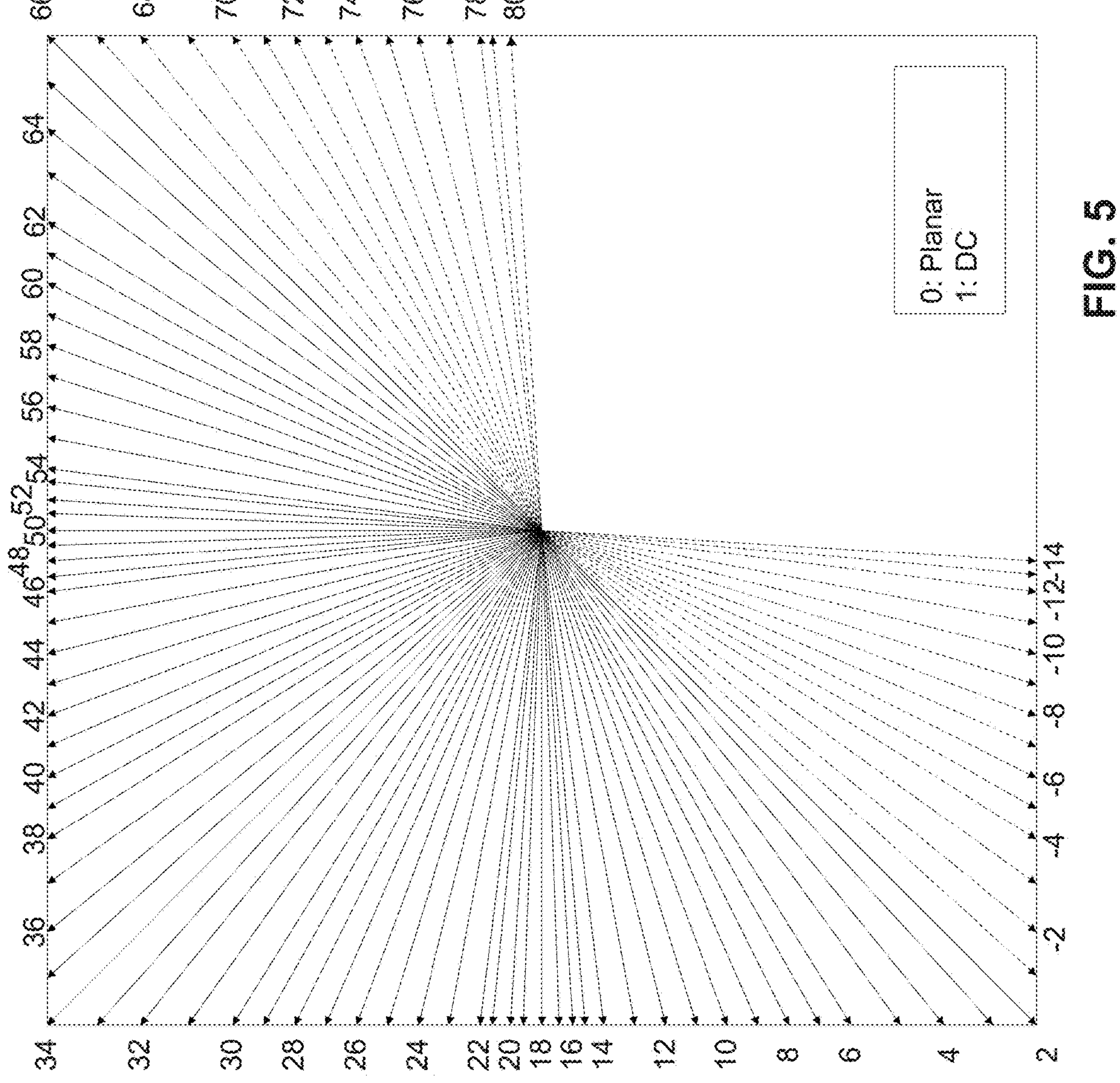
FIG. 5 illustrates a diagram of intra modes in accordance with some implementations of the present disclosure.

FIG. 5 illustrates a diagram of intra modes in accordance with some examples. In general, a basic intra prediction scheme applied in VVC is almost the same as that of HEVC, except that several prediction tools are further extended, added and/or improved, e.g., extended intra prediction with wide-angle intra modes, Multiple Reference Line (MRL) intra prediction, Position-Dependent intra Prediction Combination (PDPC), ISP prediction, Cross-Component Linear Model (CCLM) prediction, and Matrix weighted Intra Prediction (MIP).

A brief description for extended intra prediction with wide-angle intra modes is provided herein. Like HEVC, VVC uses a set of reference samples neighboring a current CU (e.g., samples above the current CU and left to the current CU) to predict samples of the current CU. However, to capture finer edge directions present in natural video (especially for video content in high resolutions, e.g., 4K), the number of angular intra modes is extended from 33 in HEVC to 93 in VVC. As shown in FIG. 5, among the 93 angular intra modes, modes 2 to 66 are conventional angular intra modes, and modes −1 to −14 and modes 67 to 80 are wide-angle intra modes. In addition to the angular intra modes, the planar mode (mode 0 in FIG. 5) and Direct Current (DC) mode (mode 1 in FIG. 5) of HEVC are also applied in VVC.

Since a quad/binary/ternary tree partition structure is applied in VVC, besides video blocks in a square shape, rectangular video blocks also exist for the intra prediction in VVC. Due to unequal width and height of one given video block, various sets of angular intra modes may be selected from the 93 angular intra modes for different block shapes. For example, for both square and rectangular video blocks, besides planar and DC modes, 65 angular intra modes among the 93 angular intra modes are also supported for each block shape. When a rectangular block shape of a video block satisfies a certain condition, an index of a wide-angle intra mode of the video block may be adaptively determined by video decoder 30 according to an index of a conventional angular intra mode received from video encoder 20 using a mapping relationship as shown in Table 1 below. That is, for non-square blocks, the wide-angle intra modes are signaled by video encoder 20 using the indexes of the conventional angular intra modes, which are mapped to indexes of the wide-angle intra modes by video decoder 30 after being parsed, thus ensuring that a total number (i.e., 67) of intra modes (i.e., the planar mode, the DC mode and 65 angular intra modes among the 93 angular intra modes) is unchanged, and the intra mode coding method is unchanged. As a result, a good efficiency of signaling intra modes is achieved while providing a consistent design across different block sizes.

The following Table 1 shows a mapping relationship between indexes of conventional angular intra modes and indexes of wide-angle intra modes for the intra prediction of different block shapes in VCC, wherein W represents a width of a video block, and H represents a height of the video block.

TABLE 1

| Block shape | Aspect ratio | Indexes of conventional angular intra modes | Indexes of wide-angle intra modes |
|---|---|---|---|
| Square, W = H | W/H == 1 | None | None |
| Flat rectangle, W > H | W/H == 2 | 2, 3, 4, 5, 6, 7, 8, 9 | 67, 68, 69, 70, 71, 72, 73, 74 |
| | W/H == 4 | 2, 3, 4, 5, 6, 7, 8, 9, 10, 11 | 67, 68, 69, 70, 71, 72, 73, 74, 75, 76 |
| | W/H == 8 | 2, 3, 4, 5, 6, 7, 8, 9, 10, 11, 12, 13 | 67, 68, 69, 70, 71, 72, 73, 74, 75, 76, 77, 78 |
| | W/H == 16 | 2, 3, 4, 5, 6, 7, 8, 9, 10, 11, 12, 13, 14, 15 | 67, 68, 69, 70, 71, 72, 73, 74, 75, 76, 77, 78, 79, 80 |
| Tall rectangle, W < H | W/H == 1/2 | 59, 60, 61, 62, 63, 64, 65, 66 | −8, −7, −6, −5, −4, −3, −2, −1 |
| | W/H == 1/4 | 57, 58, 59, 60, 61, 62, 63, 64, 65, 66 | −10, −9, −8, −7, −6, −5, −4, −3, −2, −1 |
| | W/H == 1/8 | 55, 56, 57, 58, 59, 60, 61, 62, 63, 64, 65, 66 | −12, −11, −10, −9, −8, −7, −6, −5, −4, −3, −2, −1 |
| | W/H == 1/16 | 53, 54, 55, 56, 57, 58, 59, 60, 61, 62, 63, 64, 65, 66 | −14, −13, −12, −11, −10, −9, −8, −7, −6, −5, −4, −3, −2, −1 |

Figure 6A:
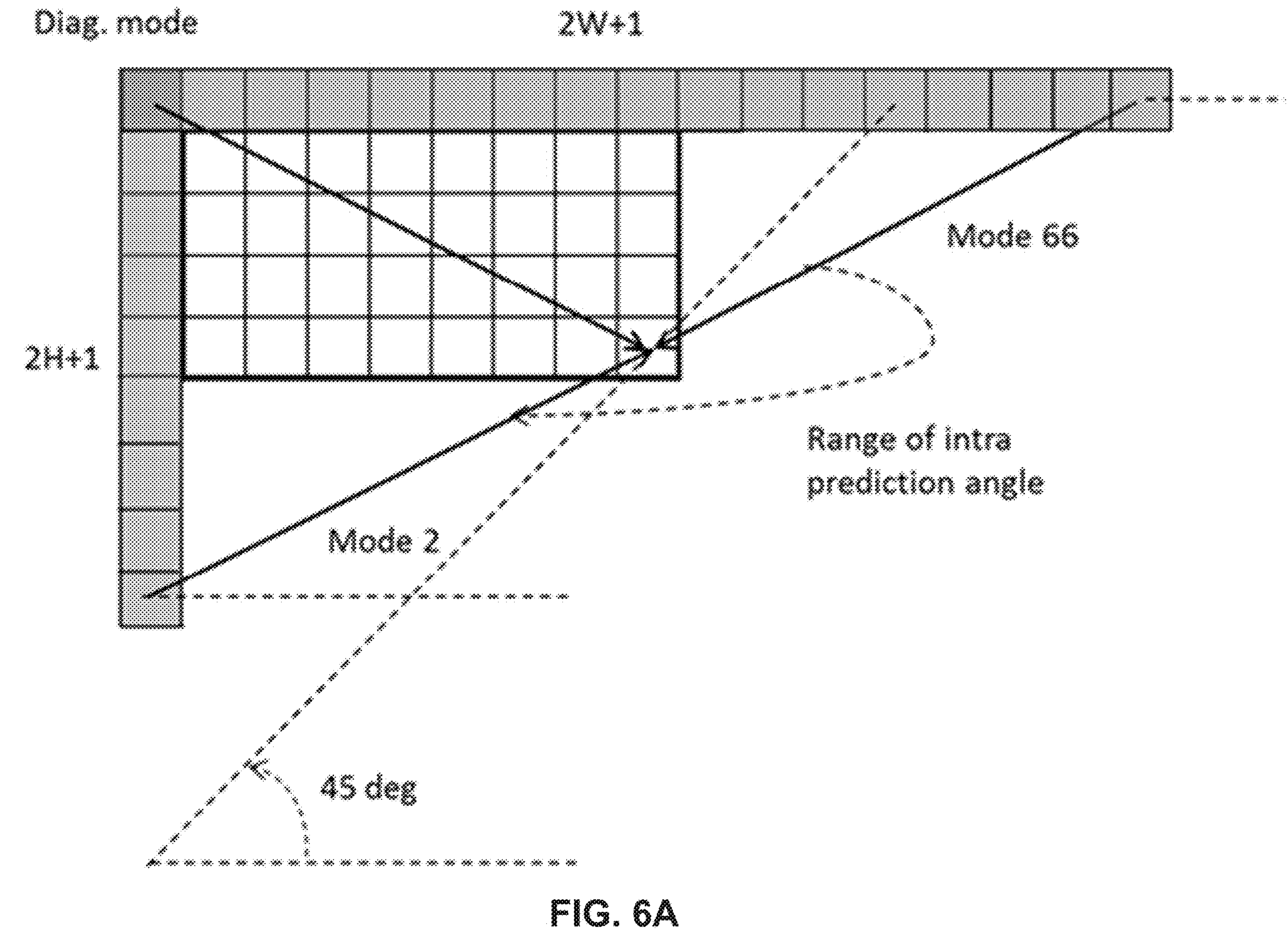
FIGS. 6A and 6B illustrate exemplary reference samples for wide-angular intra prediction in accordance with some implementations of the present disclosure.
Figure 6B:
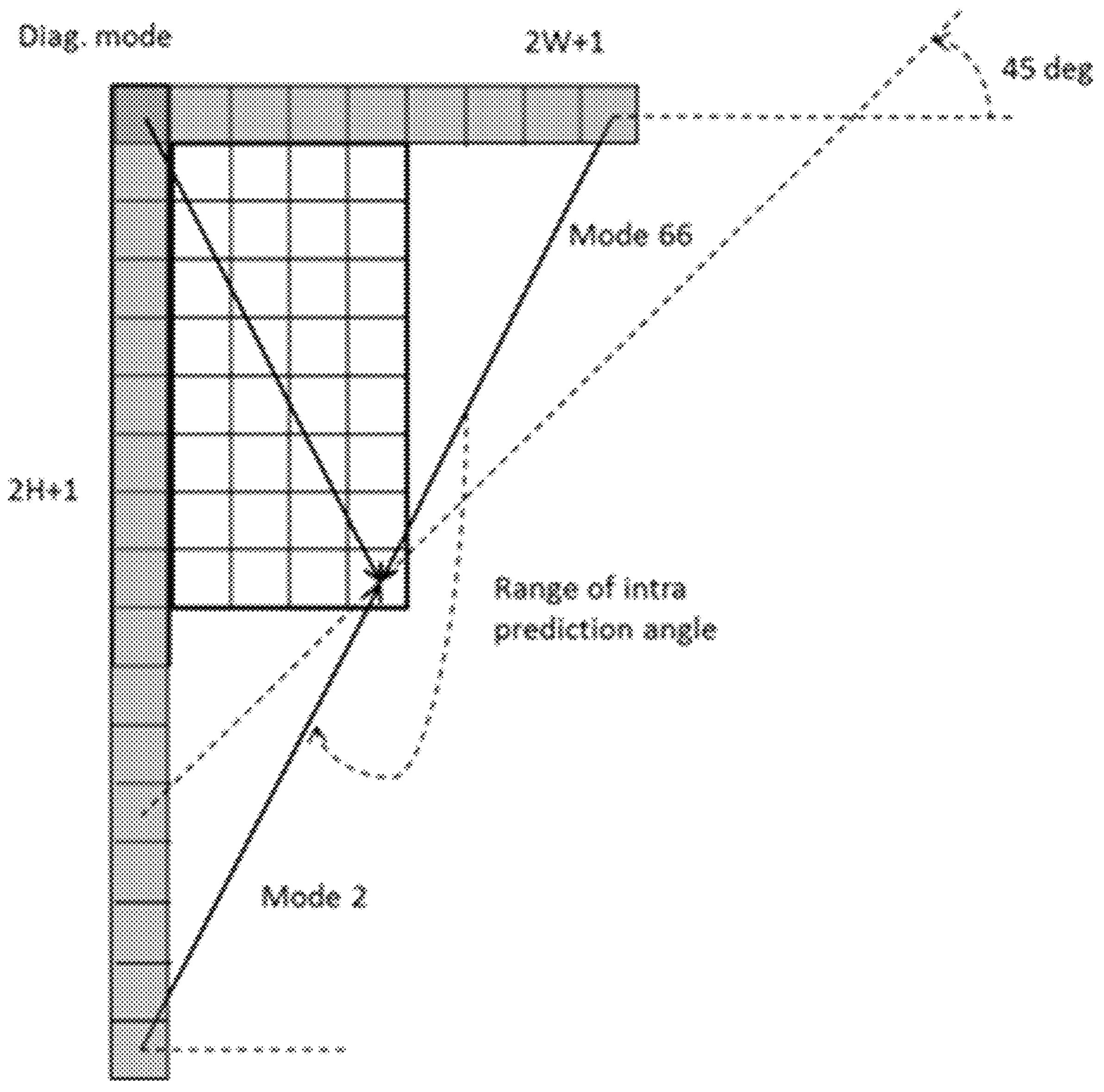

As shown in FIGS. 6A and 6B, top reference samples (illustrated in gray color) with length 2 W+1 and the left reference samples (illustrated in gray color) with length 2 H+1 are used for wide-angle intra prediction to support the angular intra modes.

Figure 7:
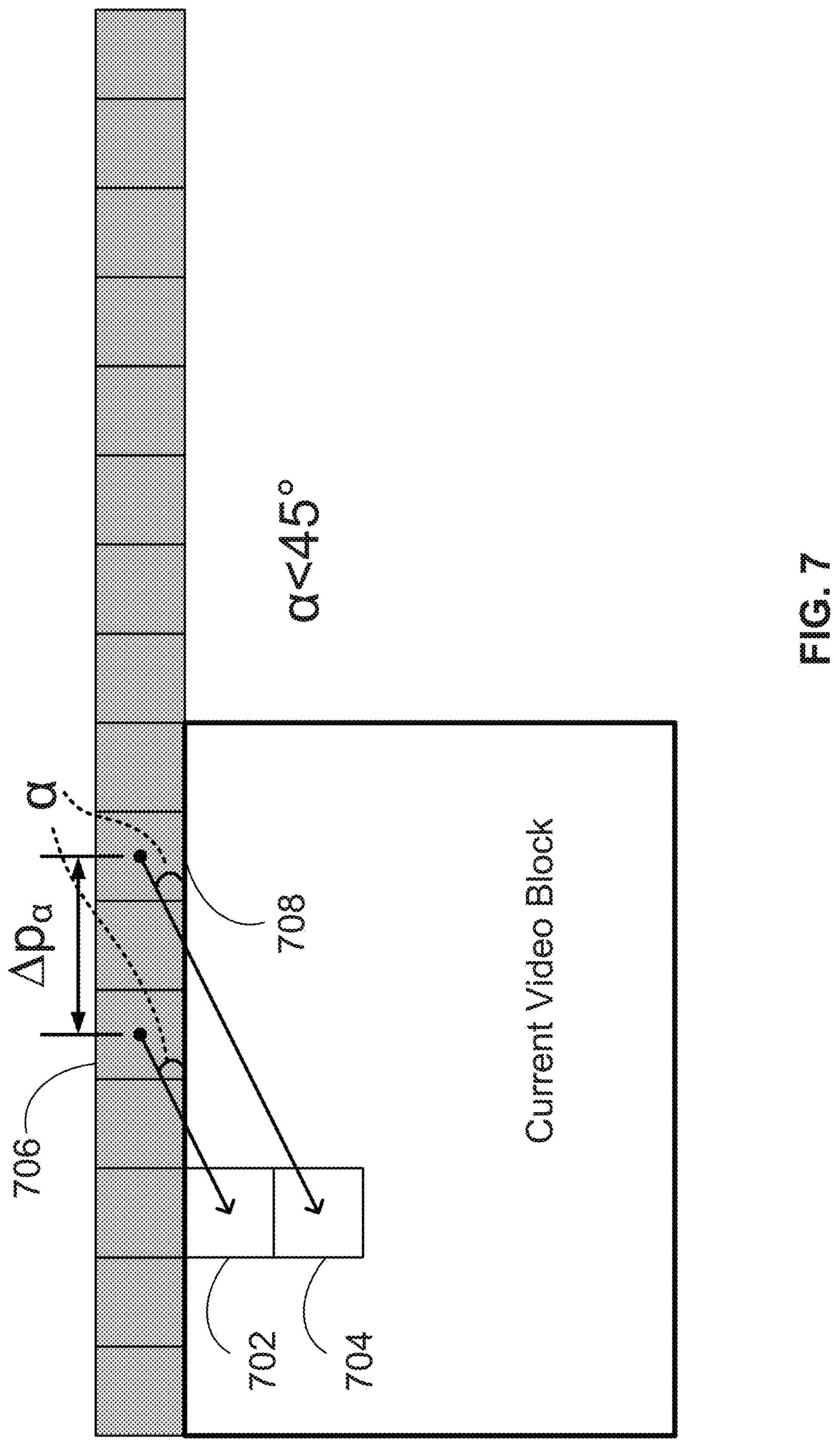
FIG. 7 illustrates an exemplary discontinuity in case of wide-angle intra prediction direction in accordance with some implementations of the present disclosure.

As shown in FIG. 7, a current video block (e.g., a current CU) is a flat rectangle and an interpolation angle $\alpha<45$ degrees, two vertically-adjacent predicted samples (e.g., 702 and 704) may be respectively predicted based on two non-adjacent reference samples (e.g., 706 and 708) in the case of wide-angle intra prediction. Low-pass reference samples filter and side smoothing can be applied to the wide-angle prediction to reduce the negative effect of the increased gap $\Delta p_a$ in FIG. 7. When a wide-angle mode represents a non-fractional offset, 8 modes in the wide-angle modes satisfy this condition, which are [−14, −12, −10, 6, 72, 76, 78, 80]. When a video block is predicted by these modes, samples in the reference buffer are directly copied without applying any interpolation. With such a modification, the number of samples needed to be smoothed is reduced. In addition, the modification aligns the design of non-fractional modes in the conventional prediction modes and wide-angle modes.

In VVC, 4:2:2 and 4:4:4 chroma formats are supported as well as 4:2:0. Chroma derived mode (DM) derivation table for 4:2:2 chroma format was initially ported from HEVC extending the number of entries from 35 to 67 to align with the extension of intra prediction modes.

Since HEVC specification does not support interpolation angles below −135 degrees and above 45 degrees, luma intra prediction modes ranging from 2 to 5 are mapped to 2. Therefore, chroma DM derivation table for 4:2:2: chroma format is updated by replacing some values of the entries of the mapping table to convert interpolation angle more precisely for chroma blocks.

As mentioned earlier, the intra prediction samples are generated from a set of neighboring reference samples, which may introduce discontinuities along block boundaries between a current video block and neighboring video blocks thereof. The PDPC tool can be used in VVC to solve such problems by employing a weighted combination of intra prediction samples with boundary reference samples. In VVC, PDPC may be enabled for the following intra modes without signaling: planar mode, DC mode, angular intra modes with indexes less than or equal to that of a horizontal intra mode (i.e., mode 18), and angular intra modes with indexes greater than or equal to that of a vertical intra mode (i.e., mode 50) and less than or equal to 80. If a Block Differential Pulse Coded Modulation (BDPCM) mode is applied for the current block or an index of a selected row/column of reference samples for MRL intra prediction is greater than 0, PDPC is not applied.

Figure 8:
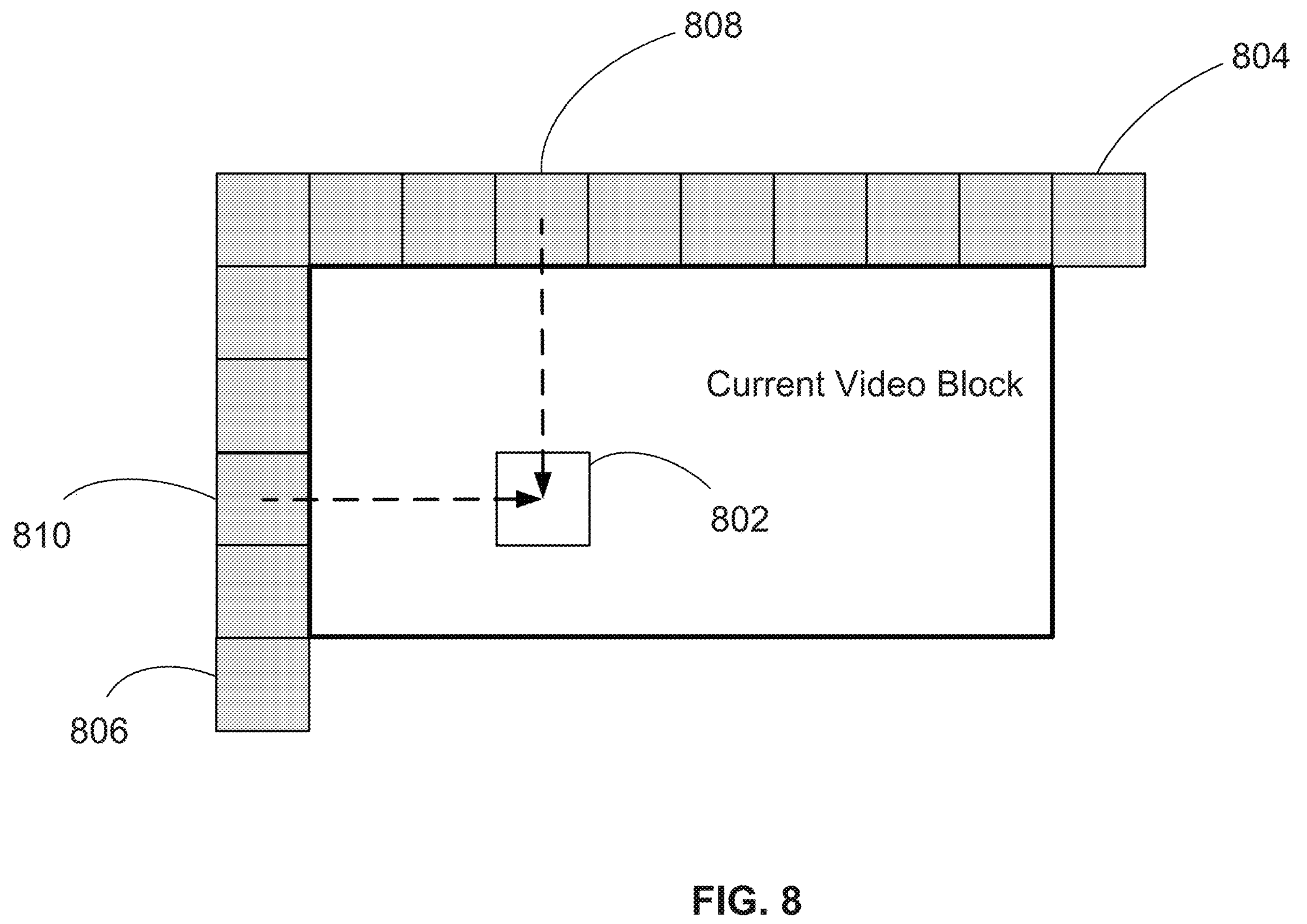
FIG. 8 illustrates an interpolation of a sample in a current video block for intra prediction in planar mode in accordance with some implementations of the present disclosure.

FIG. 8 illustrates an interpolation of a sample in a current video block for intra prediction in planar mode in accordance with some implementations of the present disclosure. As shown in FIG. 8, sample 802 is one of samples in the current video block that is to be predicted/interpolated. Reference samples of the current video block for interpolating samples (e.g., 802) of the current video block located above and left to the current video block are illustrated in gray squares. A top-right reference sample 804 located at coordinate (W, −1) with a value of p[W][−1] is used as a right reference for all the horizontal filtering. Similarly, a bottom-left reference sample 806 located at coordinate (−1, H) with a value of p[−1][H] is used as a bottom reference for all the vertical operations, where W and H are the width and the height of the current video block, respectively. Reference sample 808 has the same horizontal coordinate as sample 802 and reference sample 810 has the same vertical coordinate as sample 802. If sample 802 locates at coordinate (x, y), reference samples 808 and 810 locate at (x, −1) and (−1, y), respectively. A horizontal prediction $p_h[x][y]$ and a vertical prediction $p_v[x][y]$ for sample 802 are calculated according to Equations (1-1) and (1-2) as follows:

$$p_h[x][y]=(W-1-x)*p[-1][y]+(x+1)*p[W][-1], \quad (1\text{-}1)$$

$$p_v[x][y]=(H-1-y)*p[x][-1]+(y+1)*p[-1][H]. \quad (1\text{-}2)$$

A prediction value of sample 802 is calculated by averaging the horizontal and the vertical predictions on sample basis according to Equation (2):

$$p[x][y]=\{(p_h[x][y]\ll \log_2 W)+(p_v[x][y]\ll \log_2 H)+(1\ll(\log_2 W+\log_2 H))\}\gg(1+\log_2 W+\log_2 H), \quad (2)$$

where >> denotes a bitwise right shift operation, and << denotes a bitwise left shift operation.

Figure 25:
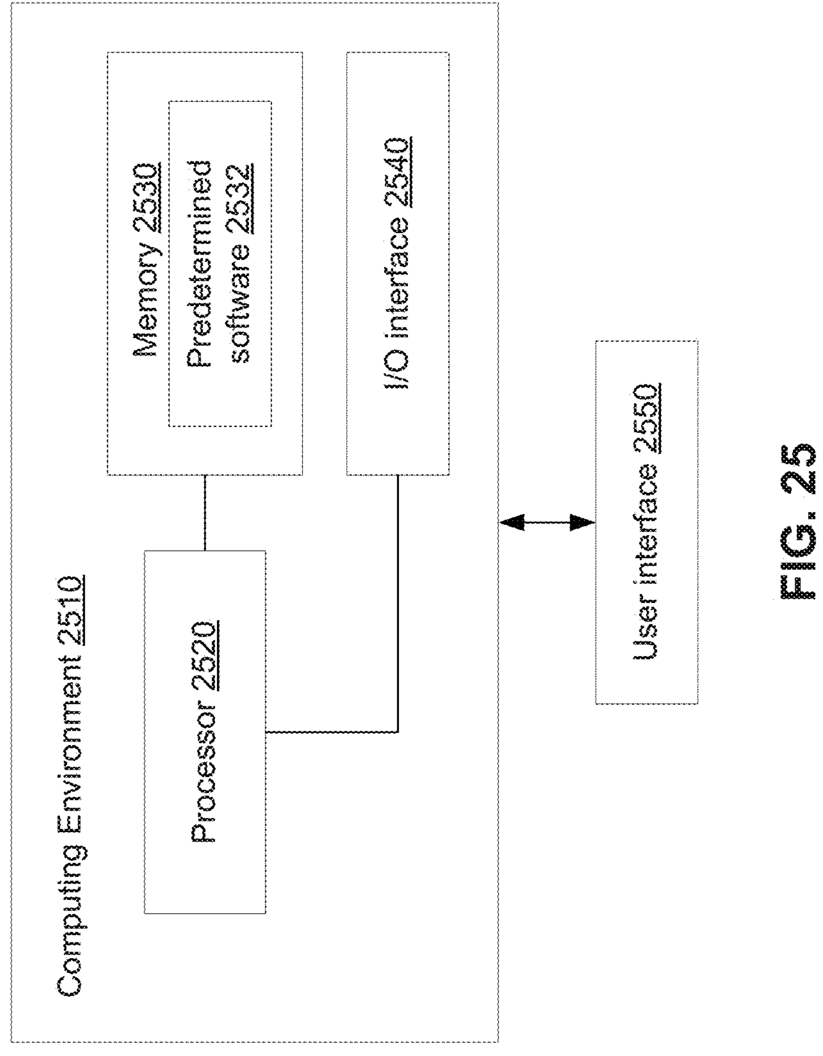
FIG. 25 is a block diagram illustrating a computing environment coupled with a user interface in accordance with some implementations of the present disclosure.

FIG. 9 is a block diagram illustrating an exemplary sample prediction process 900 in accordance with some implementations of the present disclosure. In some implementations, sample prediction process 900 can be performed by prediction processing unit 41 of video encoder 20, or prediction processing unit 81 of video decoder 30. In some implementations, sample prediction process 900 may be performed by a processor (e.g., a processor 2520 as shown in FIG. 25) on an encoder side or a decoder side. For illustration purposes only, the following description of FIG. 9 is provided with respect to the processor. In some implementations, sample prediction process 900 may include a reference sample determination 902, a block-level interpolation direction determination 904 or a sample-specific interpolation direction determination 906, and a sample interpolation 908. FIG. 9 is described below together with FIGS. 10-15.

Figure 10:
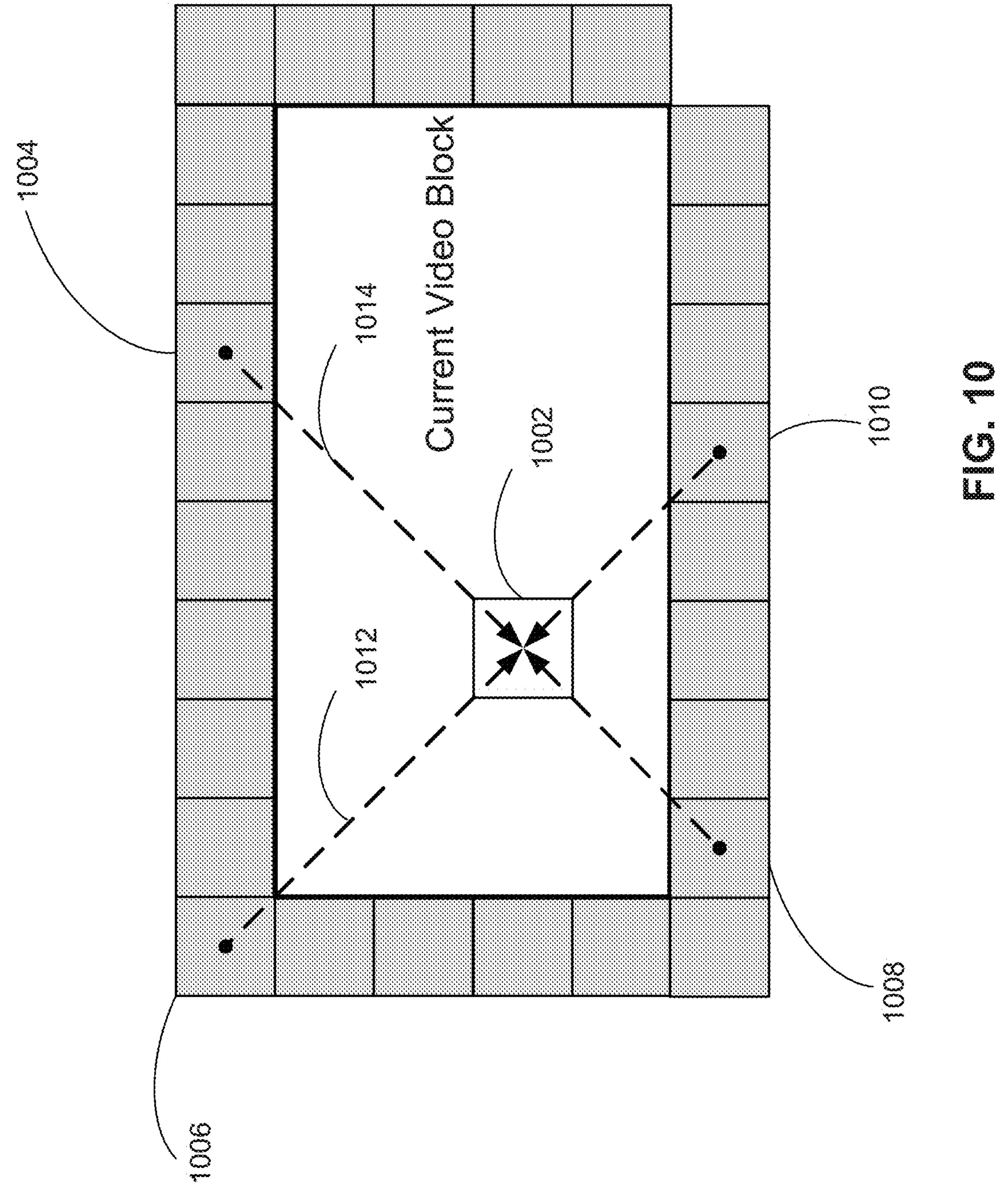
FIG. 10 illustrates a diagram of intra prediction along an interpolation direction and the perpendicular interpolation direction through a sample of the video block in accordance with some implementations of the present disclosure.

Initially, the processor may receive a plurality of reconstructed samples in neighboring block regions (e.g., previously decoded blocks) in a video frame of a video. In VVC and ECM standards, the neighboring video blocks are located on a left neighboring region of the current video block, a top neighboring region of the current video block, or both illustrated in gray squares as shown in FIG. 8. In other current or future standards, the reconstructed samples may be located on any neighboring regions of the current video block illustrated in gray squares as shown in FIG. 10.

In some implementations, to implement reference sample determination 902, the processor may determine reference samples in the neighboring video blocks according to two slant lines through a sample of the current video block. One of the two slant lines is along an interpolation direction and the other slant line is perpendicular to the first slant line. For example, as shown in FIG. 10, slant line 1012 is perpendicular to slant line 1014 on sample 1002. When the interpolation direction of sample 1002 is along with slant line 1012, four reconstructed samples (e.g., sample 1004, sample 1006, sample 1008, and sample 1010) are determined by the processor according to slant lines 1012 and 1014 as reference samples for interpolating sample 1002 in the current video block. The processor may generate a prediction of sample 1002 based on sample 1004, sample 1006, sample 1008, and sample 1010 according to bilinear interpolation.

In some implementations, the processor interpolates each of samples in the current video block along a single interpolation direction. That is, the interpolation direction is a block-level interpolation direction. For example, as shown in FIG. 11, a block-level interpolation direction with interpolation angles of $\theta_1$ and $\theta_2$ is used to interpolate all samples in the current video block (e.g., samples 1102 and 1104).

In some implementations, block-level interpolation direction determination 904 may be implemented by a processor in an encoder (e.g., video encoder 20). The processor determines the block-level interpolation direction of the current video block according to a predetermined set of candidate interpolation directions. For example, the predetermined set of candidate interpolation directions may include but not limited to $$\left\{0, \frac{\pi}{6}, \frac{\pi}{4}, \frac{\pi}{3}, \frac{3\pi}{4}\right\}$$

(i.e., {0, 30°, 45°, 60°, 135°}). The processor calculates the rate-distortion cost of the current video block when the video block is interpolated according to each of the candidate interpolation directions. In some implementations, for each candidate interpolation direction, the processor first determines reference samples along the candidate interpolation direction for each sample and interpolates the sample based on the determined reference samples. The distance between the sample and each of the reference samples are used as weights in the interpolation. The processor then calculates a rate-distortion cost of the sample, where the rate-distortion cost of the sample is determined based on an amount of distortion between the interpolated sample and the original, uncoded sample. The processor further sums up the rate-distortion costs of all the samples in the current video block as the rate-distortion cost of the current video block. The processor determines the candidate interpolation direction associated with the rate-distortion cost having a minimum value as the block-level interpolation direction. The processor may generate a syntax element (e.g., planar_pred_dir) and signal the determined block-level interpolation direction into a bitstream to a decoder (e.g., decoder 30). A processor in the decoder (e.g., video decoder 30) may receive coded current video block and an index (e.g., the syntax element) signaling the block-level interpolation direction. The processor in the decoder may decode the coded current video block based on the received the syntax element.

Figure 11:
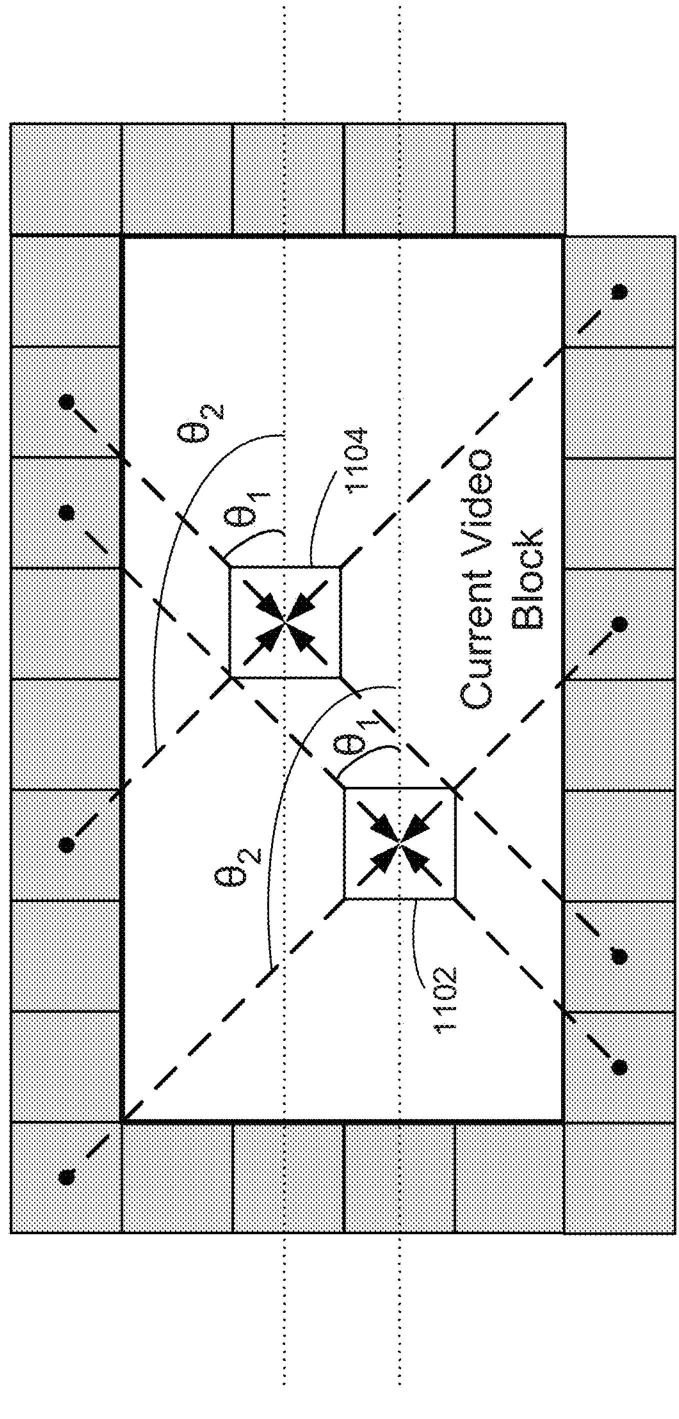
FIG. 11 illustrates a diagram of intra prediction using a block-level interpolation direction to interpolate samples in a video block in accordance with some implementations of the present disclosure.
Figure 12:
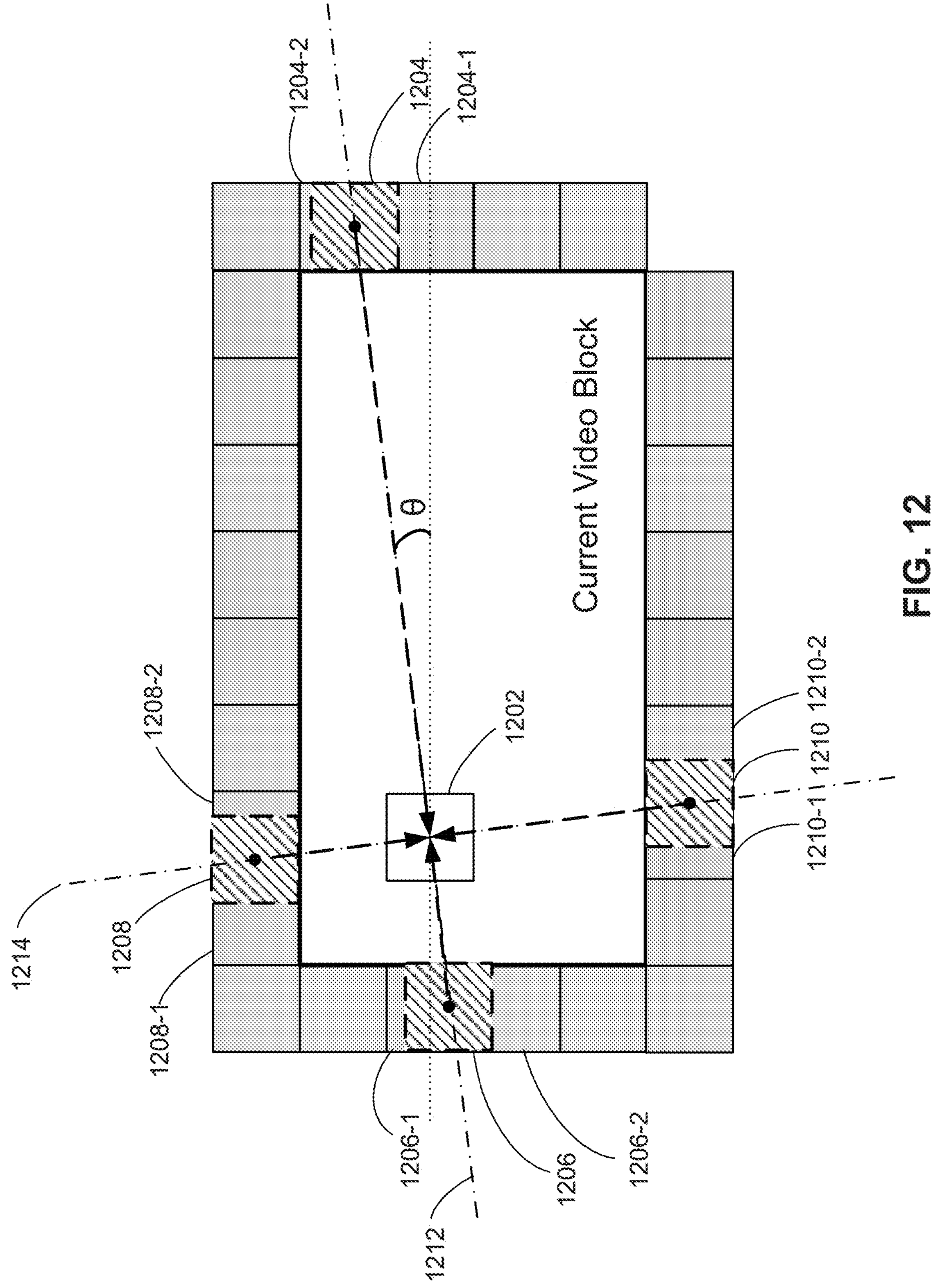
FIG. 12 illustrates a diagram of intra prediction using fractional reference samples to interpolate a sample in a video block in accordance with some implementations of the present disclosure.

As shown in FIG. 11, because interpolation angles $\theta_1$=45° and $\theta_2$=135°, all reference samples used for interpolating samples in the current video block (e.g., samples 1102 and 1104) lie on the interpolation direction. In some implementations, reference samples do not lie on the interpolation direction. For example, FIG. 12 illustrates a diagram of intra prediction using fractional reference samples to interpolate a sample in a video block in accordance with some implementations of the present disclosure. Interpolation angle θ in FIG. 12 is not equal to 45° or 135°, some of the reconstructed samples (illustrated in gray squares) in the neighboring block regions may not lie on the interpolation direction (illustrated in dashed arrow lines). The processor generates fractional reference samples (e.g., samples 1204, 1206, 1208, and 1210) by interpolating two adjacent reconstructed samples nearest to the interpolation direction (e.g., dash dot lines 1212 and 1214). As shown in FIG. 12, fractional reference sample 1204 (illustrated in dashed square) is generated by interpolating reconstructed samples 1204-1 and 1204-2. Similarly, fractional reference sample 1206 (illustrated in dashed square) is generated by interpolating reconstructed samples 1206-1 and 1206-2. Fractional reference sample 1208 (illustrated in dashed square) is generated by interpolating reconstructed samples 1208-1 and 1208-2. Fractional reference sample 1210 (illustrated in dashed square) is generated by interpolating reconstructed samples 1210-1 and 1210-2.

In some implementations, the processor can calculate coordinates of the fractional reference samples based on the width and the height of the current video block and the interpolation direction of the current video block according to Equations (3-1)-(6-2):

$$x_1 = \begin{cases} W, & 0 \le \theta \le \tan^{-1}\left(\frac{y+1}{W-x}\right) \\ x + \frac{y+1}{\tan\theta}, & \tan^{-1}\left(\frac{y+1}{W-x}\right) \le \theta \le \frac{\pi}{2} \end{cases}, \quad (3\text{-}1)$$

$$y_1 = \begin{cases} y - (W-x) * \tan\theta, & 0 \le \theta \le \tan^{-1}\left(\frac{y+1}{W-x}\right) \\ -1, & \tan^{-1}\left(\frac{y+1}{W-x}\right) \le \theta \le \frac{\pi}{2} \end{cases}, \quad (3\text{-}2)$$

$$x_2 = \begin{cases} -1, & 0 \le \theta \le \tan^{-1}\left(\frac{H-y}{x+1}\right) \\ x - \frac{H-y}{\tan\theta}, & \tan^{-1}\left(\frac{H-y}{x+1}\right) \le \theta \le \frac{\pi}{2} \end{cases}, \quad (4\text{-}1)$$

$$y_2 = \begin{cases} y + (x+1) * \tan\theta, & 0 \le \theta \le \tan^{-1}\left(\frac{H-y}{x+1}\right) \\ H, & \tan^{-1}\left(\frac{H-y}{x+1}\right) \le \theta \le \frac{\pi}{2} \end{cases}, \quad (4\text{-}2)$$

$$x_3 = \begin{cases} x - \frac{y+1}{\tan\left(\frac{\pi}{2}-\theta\right)}, & 0 \le \theta \le \frac{\pi}{2} - \tan^{-1}\left(\frac{y+1}{x+1}\right) \\ -1, & \tan^{-1}\left(\frac{y+1}{x+1}\right) \le \theta \le \frac{\pi}{2} \end{cases}, \quad (5\text{-}1)$$

$$y_3 = \begin{cases} -1, & 0 \le \theta \le \frac{\pi}{2} - \tan^{-1}\left(\frac{y+1}{x+1}\right) \\ y - (x+1) * \tan\left(\frac{\pi}{2}-\theta\right), & \tan^{-1}\left(\frac{y+1}{x+1}\right) \le \theta \le \frac{\pi}{2} \end{cases}, \quad (5\text{-}2)$$

$$x_4 = \begin{cases} x + \frac{H-y}{\tan\left(\frac{\pi}{2}-\theta\right)}, & 0 \le \theta \le \frac{\pi}{2} - \tan^{-1}\left(\frac{H-y}{W-x}\right) \\ W, & \frac{\pi}{2} - \tan^{-1}\left(\frac{H-y}{W-x}\right) \le \theta \le \frac{\pi}{2} \end{cases}, \quad (6\text{-}1)$$

$$y_4 = \begin{cases} H, & 0 \le \theta \le \frac{\pi}{2} - \tan^{-1}\left(\frac{H-y}{W-x}\right) \\ y + (W-x) * \tan\left(\frac{\pi}{2}-\theta\right), & \frac{\pi}{2} - \tan^{-1}\left(\frac{H-y}{W-x}\right) \le \theta \le \frac{\pi}{2} \end{cases}, \quad (6\text{-}2)$$

where W and H denote a width and a height of the current video block, θ denotes an interpolation angle of the current video block and $$0 \le \theta \le \frac{\pi}{2},$$

(x, y) denotes the coordinate of the sample to be interpolated (e.g., sample 1202 in FIG. 12), $(x_1, y_1)$ denotes the coordinate of the fractional reference sample (e.g., sample 1204 in FIG. 12) in the neighboring block region that is right to the current video block, $(x_2, y_2)$ denotes the coordinate of the fractional reference sample (e.g., sample 1206 in FIG. 12) in the neighboring block region that is left to the current video block, $(x_3, y_3)$ denotes the coordinate of the fractional reference sample (e.g., sample 1208 in FIG. 12) in the neighboring block region that is above the current video block, $(x_4, y_4)$ denotes the coordinate of the fractional reference sample (e.g., sample 1210 in FIG. 12) in the neighboring block region that is below the current video block. The processor then may determine weights used for interpolating each of the fractional reference samples based on the calculated coordinate of the fractional reference sample and the two adjacent reconstructed samples. The processor further interpolates the sample (e.g., sample 1202 in FIG. 12) in the current video block based on the four fractional reference samples generated by the processor.

The processor may use finite-precision interpolation for generating the fractional reference samples and interpolating the sample in the current video block. In some implementations, typical interpolation precision applied by the processor includes integer, ½, ¼, ⅛, 1/16, etc. For example, when the processor calculates the coordinate of the fractional reference sample using any of Equations (3-1)-(6-2), the calculated coordinate of the fractional reference samples is rounded to the nearest allowed fractional position.

Consistent with the present disclosure, in VVC or ECM standards, because reconstructed samples below and right to the current video block are padded from the above-right and left-bottom samples of the current video block, the reference samples below and right to the current video block are not used for interpolating the current video block. For example, if the video is coded via VVC or ECM standards, the processor does not interpolate sample 1202 in FIG. 12 based on samples 1204 and 1210. Instead, the processor interpolates sample 1202 based on samples 1206 and 1208. If the reference samples below and right to the current video block can be generated for interpolating the current video block using other methods or in other standards, four reference samples are used for interpolating the current video block.

Figure 13:
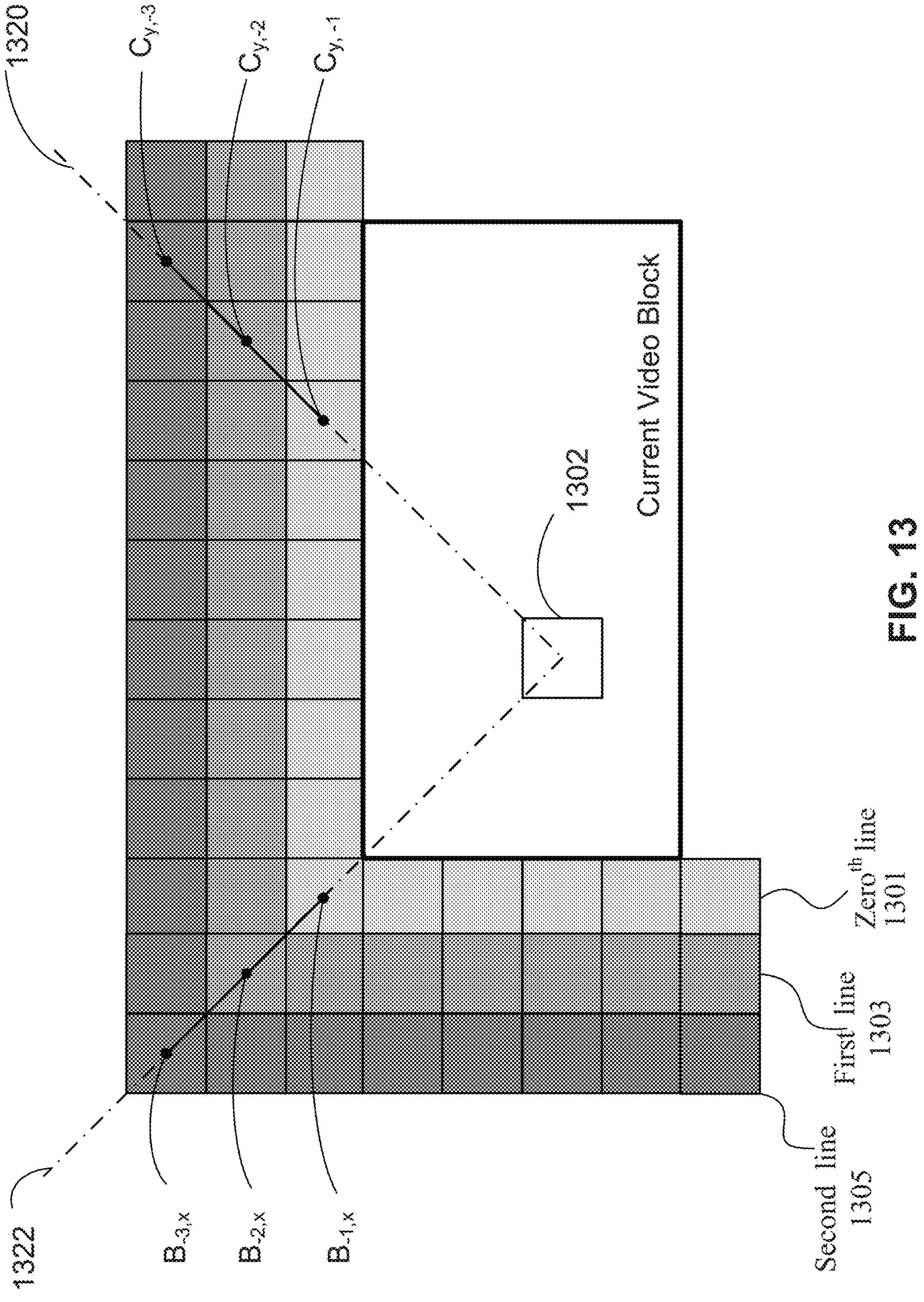
FIG. 13 illustrates a diagram of intra prediction using second order gradients of reconstructed samples in neighboring video blocks to interpolate a sample in a video block in accordance with some implementations of the present disclosure.

In some implementations, to implement block-level interpolation direction determination 904, the interpolation direction of the current video block is inferred from the neighboring reconstructed samples in the encoder (e.g., video encoder 20) or the decoder (e.g., decoder 30). For example, FIG. 13 illustrates a diagram of intra prediction using second order gradients of reconstructed samples in neighboring video blocks to interpolate a sample in a video block in accordance with some implementations of the present disclosure. Three neighboring rows/columns of reconstructed sample (e.g., a zeroth line 1301, a first line 1303, and a second line 1305) in FIG. 13 are used to infer the interpolation direction of the current video block. In some implementations, second order gradients of the neighboring reconstructed samples are used to decide the block-level interpolation direction. For each sample within the current video block (e.g., sample 1302 in FIG. 13), the second order gradients $g_1$ and $g_2$ along the inferred interpolation direction (e.g., line 1320) and its perpendicular direction (e.g., line 1322) are calculated according to Equation (7-1) and (7-2) as follows:

$$g_1 = (B_{-2,x} - B_{-1,x}) - (B_{-3,x} - B_{-2,x}) = 2B_{-2,x} - B_{-1,x} - B_{-3,x}, \tag{7-1}$$

$$g_2 = (C_{y,-2} - C_{y,-1}) - (C_{y,-3} - C_{y,-2}) = 2C_{y,-2} - C_{y,-1} - C_{y,-3}, \tag{7-2}$$

where $C_{y,-3}$, $C_{y,-2}$ and $C_{y,-1}$ denote the right neighboring samples along the interpolation direction (e.g., line 1320), and $B_{-3,x}$, $B_{-2,x}$ and $B_{-1,x}$ denote the left neighboring samples along the perpendicular interpolation direction (e.g., line 1322). In some implementations, L1 norm or L2 norm is used to measure energy of the variation caused by the change between neighbouring reconstructed samples. A cost of the current video block can be calculated by summing up the costs of all samples in the current video block, where the cost of each sample in the current video block is calculated based on the second order gradients according to Equations (7-1) and (7-2) in L1 norm or L2 norm. The processor may calculate the cost of the current video block according to Equations (8) or (9), respectively.

$$cost1 = \sum_{y=0}^{H-1} \sum_{x=0}^{W-1} (|2B_{-2,x} - B_{-1,x} - B_{-3,x}| + |2C_{y,-2} - C_{y,-1} - C_{y,-3}|), \tag{8}$$

$$cost2 = \sum_{y=0}^{H-1} \sum_{x=0}^{W-1} (|2B_{-2,x} - B_{-1,x} - B_{-3,x}|^2 + |2C_{y,-2} - C_{y,-1} - C_{y,-3}|^2). \tag{9}$$

In some implementations, as shown in Equations (7-1) and (7-2), the first order gradient is used to generate the second order gradient. The first order gradients (e.g., $(B_{-2,x}-B_{-1,x})$, $(B_{-3,x}-B_{-2,x})$, $(C_{y,-2}-C_{y,-1})$, and $(C_{y,-3}-C_{y,-2})$) may be normalized based on distances between the neighboring reconstructed samples used for calculating the respective first order gradients. The second order gradients $g_1$ and $g_2$ are then calculated based on the normalized first order gradients according to Equations (10-1) and (10-2):

$$g_1 = \frac{B_{-2,x} - B_{-1,x}}{d_1} - \frac{B_{-3,x} - B_{-2,x}}{d_2}, \tag{10-1}$$

$$g_2 = \frac{C_{y,-2} - C_{y,-1}}{d_3} - \frac{C_{y,-3} - C_{y,-2}}{d_4}, \tag{10-2}$$

where $d_1$ denotes the distance between reconstructed samples $B_{-2,x}$ and $B_{-1,x}$, $d_2$ denotes the distance between reconstructed samples $B_{-3,x}$ and $B_{-2,x}$, $d_3$ denotes the distance between reconstructed samples $C_{y,-2}$ and $C_{y,-1}$, and $d_4$ denotes the distance between reconstructed samples $C_{y,-3}$ and $C_{y,-2}$.

In some implementations, reference samples in the zeroth line, the first line, or the second line may not lie on the interpolation direction. Consistent with the present disclosure, the processor may generate fractional reference samples (e.g., samples 1404, 1406, 1408, 1410, 1412, and 1414 in FIG. 14) by interpolating two adjacent reconstructed samples in a same line (e.g., the zeroth line, the first line, or the second line) and nearest to the interpolation direction (e.g., dash dot lines 1420 and 1422). For example, the processor interpolates samples 1404, 1406, 1408, 1410, 1412, and 1414 using in a same interpolation method as it does for samples 1204, 1206, 1208, and 1210 in FIG. 12. The generated fractional reference samples are then used to calculate a cost of the sample (e.g., sample 1402) in the current video block according to Equation (8) or Equation (9).

Figure 15:
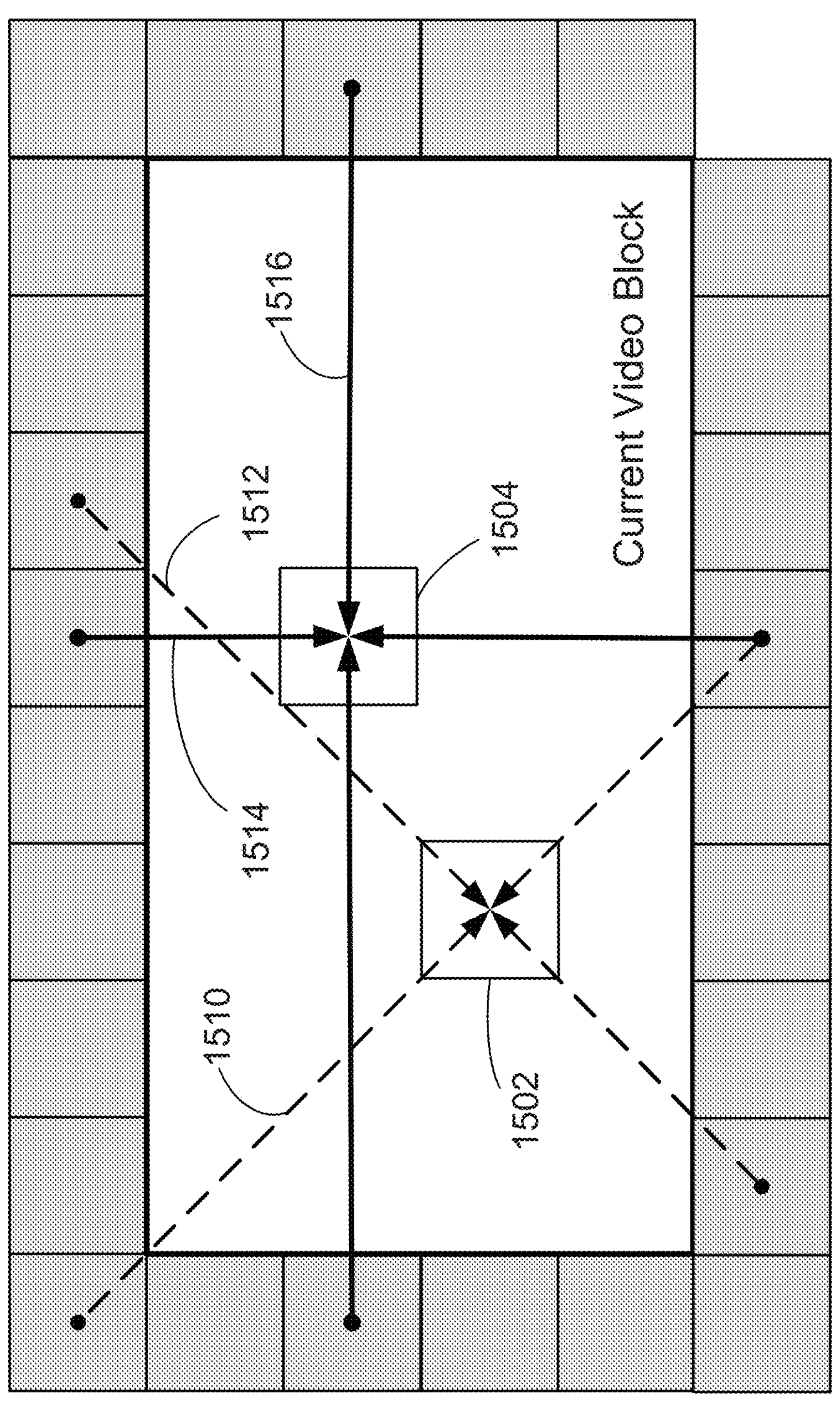
FIG. 15 illustrates a diagram of intra prediction using different sample-specific interpolation directions to interpolate samples in a video block in accordance with some implementations of the present disclosure.

In some implementations, to implement sample-specific interpolation direction determination 906, the processor may generate different sample-specific interpolation directions for interpolating each of a plurality of samples in the current video block. For example, FIG. 15 illustrates a diagram of intra prediction using different sample-specific interpolation directions to interpolate samples in a video block in accordance with some implementations of the present disclosure. Lines 1510 and 1512 in FIG. 15 infer a hypothesis interpolation direction and the perpendicular hypothesis interpolation direction used for interpolating sample 1502, and lines 1514 and 1516 infer a hypothesis interpolation direction and the hypothesis perpendicular interpolation direction used for interpolating sample 1504.

For each of the plurality of the samples in the current video block, the processor determines a sample-specific interpolation direction for each individual sample based on a cost when the sample is interpolated according to each of the plurality of hypothesis interpolation directions. The cost of the sample (e.g., sample 1302) at coordinates (x, y) may be calculated according to L1 norm or L2 norm of the second order gradient using Equation (11) or Equation (12) as follows:

$$cost1 = |2B_{-2,x} - B_{-1,x} - B_{-3,x}| + |2C_{y,-2} - C_{y,-1} - C_{y,-3}| = |(B_{-2,x} - B_{-1,x}) - (B_{-3,x} - B_{-2,x})| + |(C_{y,-2} - C_{y,-1}) - (C_{y,-3} - C_{y,-2})|, \quad (11)$$

$$cost2 = |2B_{-2,x} - B_{-1,x} - B_{-3,x}|^2 + |2C_{y,-2} - C_{y,-1} - C_{y,-3}|^2 = |(B_{-2,x} - B_{-1,x}) - (B_{-3,x} - B_{-2,x})|^2 + |(C_{y,-2} - C_{y,-1}) - (C_{y,-3} - C_{y,-2})|^2, \quad (12)$$

wherein $C_{y,-3}$, $C_{y,-2}$ and $C_{y,-1}$ denote the right neighboring samples along the interpolation direction (e.g., line 1320), and $B_{-3,x}$, $B_{-2,x}$ and $B_{-1,x}$ denote the left neighboring samples along the perpendicular interpolation direction (e.g., line 1322). Further, the processor calculates a cost according to each of the hypothesis interpolation directions of the sample according to Equations (11) or (12). The processor determines the hypothesis interpolation direction associated with the cost having a minimum value as the sample-specific interpolation direction.

In some implementations, consistent with the present disclosure, first order gradients (e.g., $(B_{-2,x}-B_{-1,x})$, $(B_{3,x}-B_{-2,x})$, $(C_{y,-2}-C_{y,-1})$, and $(C_{y,-3}-C_{y,-2})$ in Equations (11) and (12) may be normalized based on distances between the neighboring reconstructed samples used for calculating the respective first order gradients. Cost1 in L1 norm and cost 2 in L2 norm may be calculated based on the normalized first order gradients according to Equations (13) and (14) as follows:

$$cost1 = \left|\frac{B_{-2,x} - B_{-1,x}}{d_1} - \frac{B_{-3,x} - B_{-2,x}}{d_2}\right| + \left|\frac{C_{y,-2} - C_{y,-1}}{d_3} - \frac{C_{y,-3} - C_{y,-2}}{d_4}\right|, \quad (13)$$

$$cost2 = \left|\frac{B_{-2,x} - B_{-1,x}}{d_1} - \frac{B_{-3,x} - B_{-2,x}}{d_2}\right|^2 + \left|\frac{C_{y,-2} - C_{y,-1}}{d_3} - \frac{C_{y,-3} - C_{y,-2}}{d_4}\right|^2, \quad (14)$$

where $d_1$ denotes the distance between reconstructed samples $B_{-2,x}$ and $B_{-1x}$, $d_2$ denotes the distance between reconstructed samples $B_{-3,x}$ and $B_{-2,x}$, $d_3$ denotes the distance between reconstructed samples $C_{y,-2}$ and $C_{y,-1}$, and $d_4$ denotes the distance between reconstructed samples $C_{y,-3}$ and $C_{y,-2}$.

Figure 14:
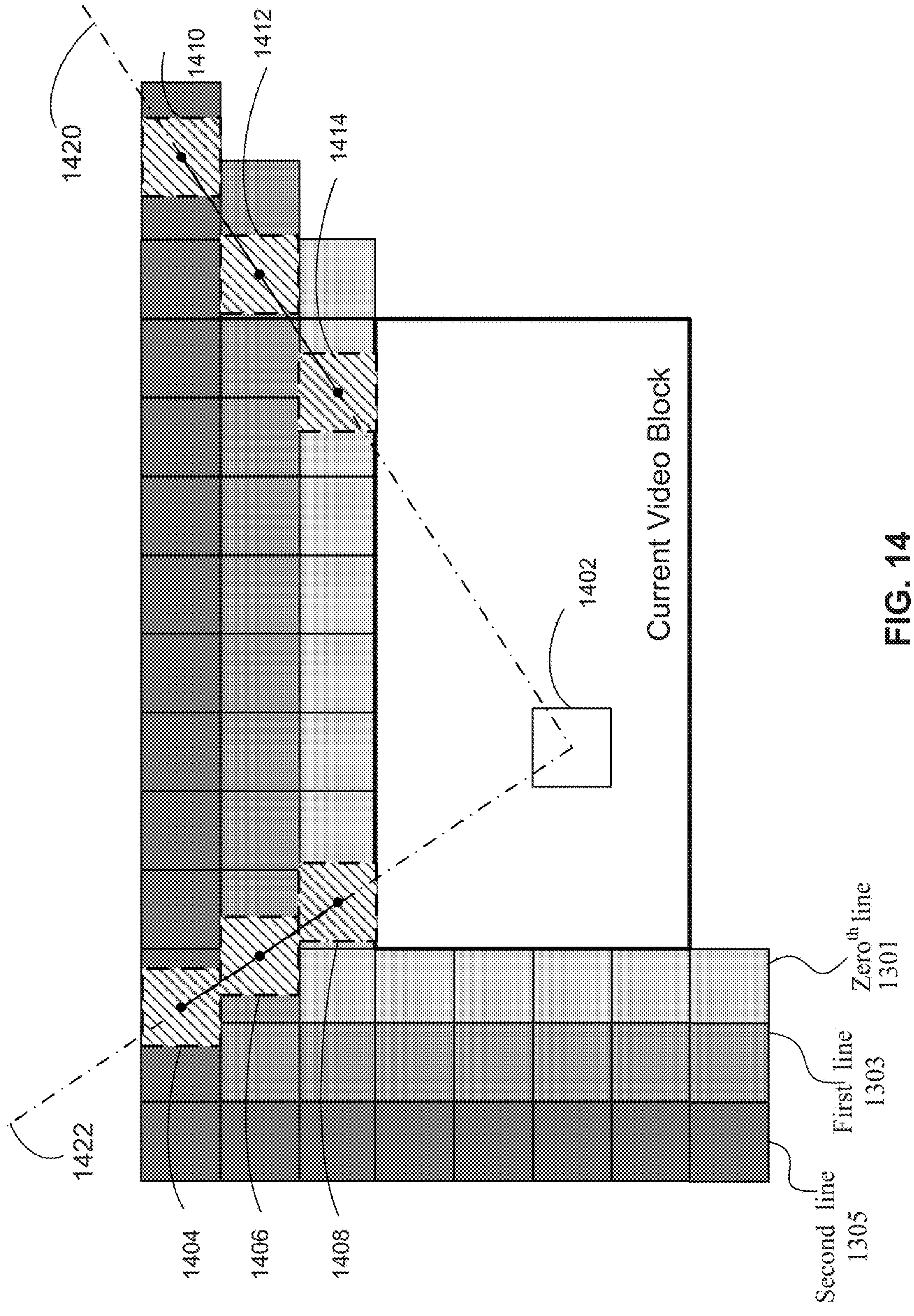
FIG. 14 illustrates a diagram of intra prediction using second order gradients of fractional reference samples generated based on the reconstructed samples in neighboring video blocks to interpolate a sample in a video block in accordance with some implementations of the present disclosure.

Consistent with the present disclosure, when one or more reconstructed samples in the neighboring block regions do not lie on the hypothesis interpolation direction of the sample, the processor may first generate a fractional reference sample by interpolating two adjacent reconstructed samples nearest to the hypothesis interpolation direction as shown in FIG. 14. The processor then uses the generated fractional reference samples to interpolate the sample along the hypothesis interpolation direction.

Referring to FIG. 9, to implement sample interpolation 908, the processor may interpolate the current video block based on either the determined block-level interpolation direction or sample-specific interpolation direction. If the processor is on the encoder side and the block-level interpolation direction is determined from a predetermined set of candidate interpolation directions, the processor may generate an index of the predetermined block-level interpolation direction and then signal the index in a bitstream to the decoder. If the processor is on the decoder side and receives an index indicating a block-level interpolation direction along with coded video block, the processor may interpolate the coded video block based on the received block-level interpolation direction.

Figure 16:
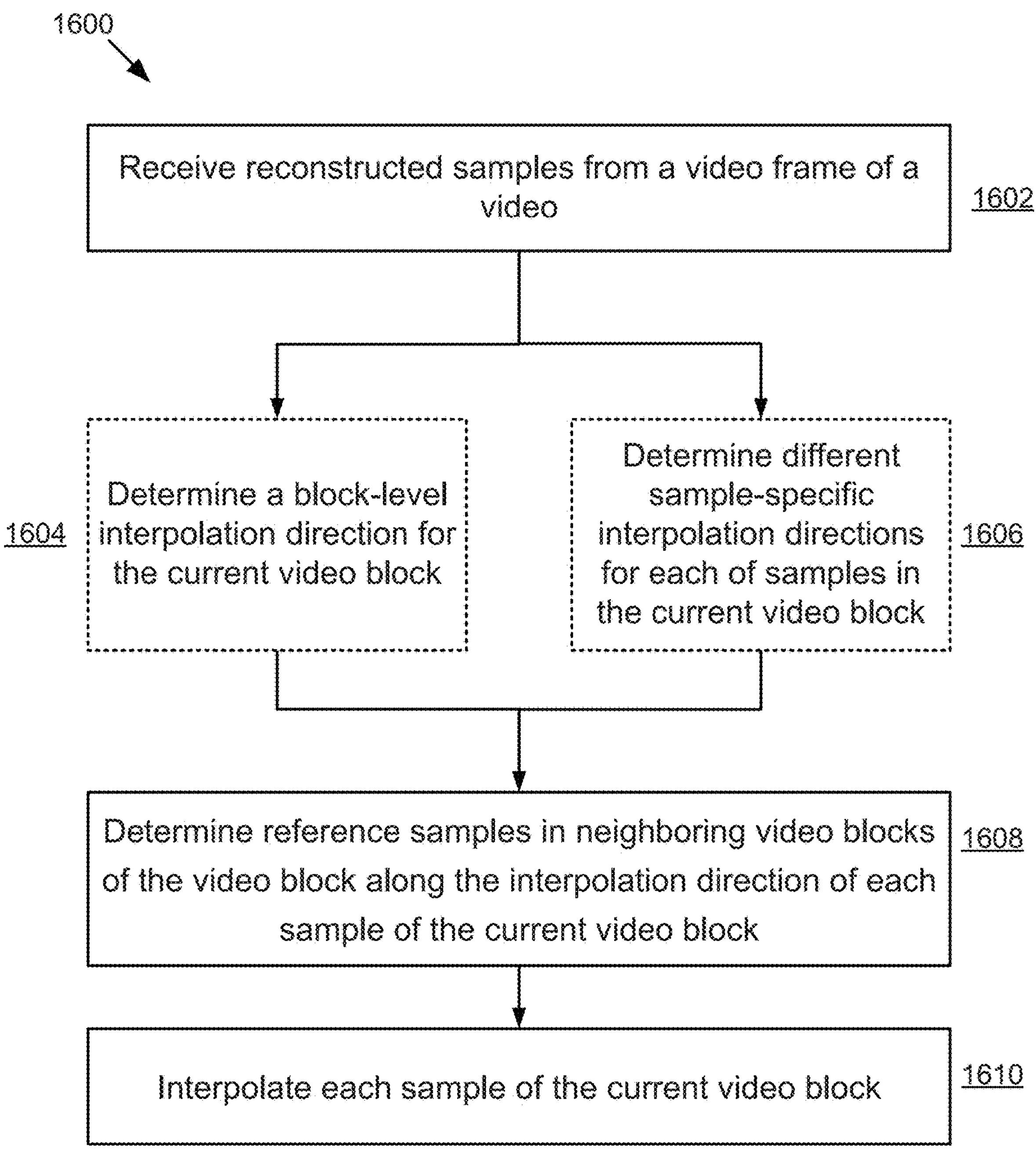
FIG. 16 is a flow chart of an exemplary method for performing intra prediction on a video block in accordance with some implementations of the present disclosure.

FIG. 16 is a flow chart of an exemplary method for performing intra prediction on a video block in accordance with some implementations of the present disclosure. Method 1600 may be implemented by a processor associated with video encoder 20 or video decoder 30. The sample prediction process described in connection with FIG. 9 may be used to implement method 1600. Method 1600 may include steps 1602-1610, among which steps 1604-1606 may be optional, as described below. Some of the steps may be optional to perform the disclosure provided herein. Further, some of the steps may be performed simultaneously, or in a different order than shown in FIG. 16.

In step 1602, the processor may receive a video frame of a video. The video frame may include a group of reconstructed samples or blocks that are neighboring block regions of a video block to be predicted (e.g., current video block in FIGS. 10-15). The current video block can be a CTU, or a CU/PU. The processor may further receive a predetermined set of candidate interpolation direction coded in the current video block or the video frame.

In some implementations of method 1600, steps 1604 and 1606 may be optionally performed to determine the interpolation direction used in step 1608.

In step 1604, the processor may determine a block-level interpolation direction for the current video block based on the received reconstructed samples in the neighboring block regions. In some implementations, an explicit method may be used to determine the block-level interpolation direction on the encoder side. The processor may determine reference samples based on the received set of candidate interpolation directions. The processor may calculate a rate-distortion cost of the current video block when the current video block is interpolated according to each of a plurality of candidate interpolation directions. The candidate interpolation direction associated with the rate-distortion cost having a minimum value is determined by the processor as the block-level interpolation direction. In some implementations, the processor determines the block-level interpolation direction implicitly based on second order gradients of the neighboring reconstructed samples. The implicit method can be performed on either the encoder side or the decoder side. For example, the processor first calculates a cost of each sample in the current video block based on the second order gradients of the neighboring reconstructed samples in each hypothesis interpolation direction. A sum of the cost of each sample is used as a cost of the current video block to determine the block-level interpolation direction among the hypothesis interpolation directions. That is, the processor determines a hypothesis interpolation direction associated with the cost of the current video block having a minimum value as the block-level interpolation direction.

In Alternative to step 1604, in step 1606, the processor may determine different sample-specific interpolation directions for each of the samples in the current video block. That is, each sample in the current video block uses an individual sample-specific interpolation direction for interpolation. To determine the sample-specific interpolation direction for each sample, the processor may calculate a cost of each sample in the current video block based on the second order gradients of the neighboring reconstructed samples in each hypothesis interpolation direction. The processor further determines a hypothesis interpolation direction associated with the cost of the sample having a minimum value as the sample-specific interpolation direction for the sample.

If the processor is on the encoder side and the block-level interpolation direction is selected from the predetermined set of candidate interpolation directions, after step 1604 or 1606, the processor may generate an index for the block-level interpolation direction and signal the index in a bit-stream to the decoder.

In step 1608, the processor determines reference samples in neighboring video blocks of the video block along the interpolation direction of each sample of the current video block. For example, the processor determines that reconstructed samples lie on a line through the sample along the interpolation direction or a line through the sample along the perpendicular interpolation direction as the reference samples for interpolating the corresponding sample in the current video block. If the reconstructed samples do not lie on the interpolation direction or on the perpendicular interpolation direction, the processor may generate fractional reference samples based on the two adjacent reconstructed samples nearest to the line along the interpolation direction or the line along the perpendicular interpolation direction. The fractional reference samples are then used for interpolating the corresponding sample in the current video block.

In step 1610, the processor may interpolate each sample of the current video block based on reference samples.

Figure 17:
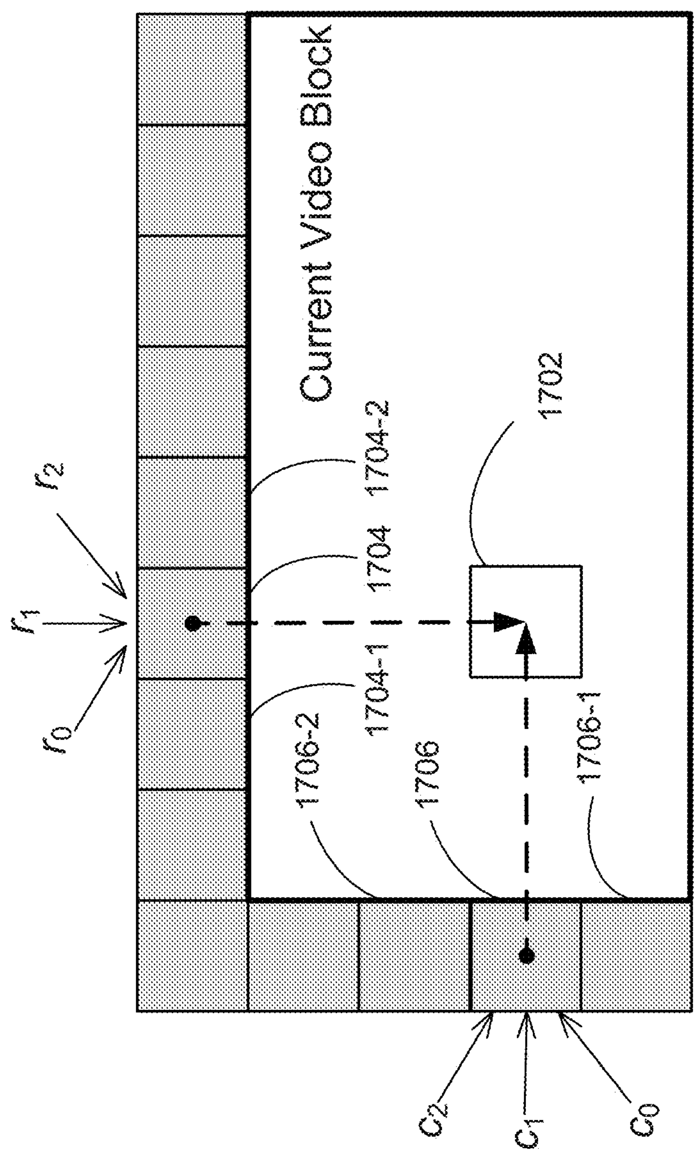
FIG. 17 is an illustration of exemplary adaptive reference sample filtering in accordance with some implementations of the present disclosure.

In some implementations, if the processor is on the decoder side, it may receive an index indicating a block-level interpolation direction along with coded video block, and interpolate the coded video block based on the block-level interpolation direction signaled in the received bit-stream. In some other implementations, the decoder processor may determine the interpolation direction on its own, e.g., using an implicit method described in part of steps 1604 (to determine a block-level interpolation direction) and 1606 (to determine a sample-specific interpolation direction). In some implementations, reference samples in the planar mode are first smoothed before being used to interpolate samples in the current video block. For example, in the VVC and ECM standards, the reference samples are filtered by a fixed filter with coefficients [1 2 1]/4 before being used to interpolate other samples. In another example, Adaptive Loop Filter (ALF) technique is used to capture the diverse property of video coding by deriving the filtering coefficient for each CTU. In some implementations, an adaptive reference sample filter can be used to filter the reference samples for intra prediction in planar mode. For example, FIG. 17 is an illustration of exemplary adaptive reference sample filtering in accordance with some implementations of the present disclosure. A three-tap filter $[r_0, r_1, r_2]$ shown in FIG. 17 is used to smooth reference samples (e.g., sample 1504) in the neighboring video blocks above the current video block, and another three-tap filter $[c_0, c_1, c_2]$ is used to smooth reference samples (e.g., sample 1506) in the neighboring video blocks left to the current video block. Samples 1704 and 1706 in FIG. 17 are reference samples used to interpolate sample 1702 in plana mode. Consistent with the present disclosure, if sample 1702 locates at coordinate (x, y), samples 1704 and 1706 locate at coordinates (x, −1) and (−1, y), respectively. A filtered value of sample 1704 can be calculated based on unfiltered values of sample 1704 and its two adjacent samples (e.g., samples 1704-1 and 1704-2) in the same row based on filter $[r_0, r_1, r_2]$. Similarly, a filtered value of sample 1706 can be calculated based on unfiltered values of sample 1706 and its two adjacent samples (e.g., samples 1706-1 and 1706-2) in the same column based on filter $[c_0, c_1, c_2]$. The filtered value of samples 1704 and 1706 can be calculated according to Equations (15-1) and (15-2) as follows:

$$p_f[x][-1] = r_0 * p[x-1][-1] + r_1 * p[x][-1] + r_2 * p[x+1][-1], \quad (15\text{-}1)$$

$$p_f[-1][y] = c_0 * p[-1][y+1] + c_1 * p[-1][y] + c_2 * p[-1][y-1], \quad (15\text{-}2)$$

where $p_f[x][-1]$ denotes the filtered value of sample 1704 based on filter $[r_0, r_1, r_2]$, p[x−1][−1] denotes the unfiltered value of sample 1704-1, p[x][−1] denotes the unfiltered value of sample 1704, p[x+1][−1] denotes the unfiltered value of sample 1704-2, $p_f[-1][y]$ denotes the filtered value of sample 1706 based on $[c_0, c_1, c_2]$, p[−1][y+1] denotes the unfiltered value of sample 1706-1, p[−1][y] denotes the unfiltered value of sample 1706, and p[−1][y−1] denotes the unfiltered value of sample 1706-2.

Consistent with the present disclosure, horizontal interpolated values $p_h[x][y]$ and vertical interpolated values $p_v[x][y]$ for sample 1702 in planar mode can be calculated according to Equations (16-1) and (16-2):

$$p_h[x][y] = (W-1-x) * p_f[-1][y] + (x+1) * p_f[W][-1], \quad (16\text{-}1)$$

$$p_v[x][y] = (H-1-y) * p_f[x][-1] + (y+1) * p_f[-1][H]. \quad (16\text{-}2)$$

A predicted value of sample 1702 can be obtained based on an average of the horizontal and vertical interpolated values $p_h[x][y]$ and $p_v[x][y]$ according to Equation (17) as follows: $q[x][y]=0.5*p_h[x][y]+0.5*p_v[x][y]$ (17).

In some implementations, a cost function of samples (e.g., sample 1702) in the current video block is defined as:

$$\text{cost} = \sum_{y=0}^{H-1} \sum_{x=0}^{W-1} (s[x][y] - q[x][y])^2, \quad (18)$$

where s [x][y] denotes the original value of the sample, and q[x][y] is the predicted value of the sample interpolated from the reference samples. In some implementations, Equation (18) can be solved with Wiener-Hopf equations as in ALF method. In some alternative implementations, the processor may use a least square method to optimize the filter coefficients (e.g., $[r_0, r_1, r_2]$ and/or $[c_0, c_1, c_2]$) to minimize the cost value in the cost function (e.g., Equation (18)). When the processor is in the encoder (e.g., video encoder 20), the processor signals the optimized filter coefficients in a bitstream to the decoder (e.g., decoder 30).

In some implementations, the processor in the encoder may receive a set of predetermined candidate filters. The processor calculates the cost value using Equation (18) according to each of the received candidate filters. The processor then determines the filter associated with the cost having a minimum value as the optimal filter. The processor may quantize the optimal filter into integer type. Further, the processor generates an index of the optimal filter in a bitstream and signals the index to the decoder. It is understood that the type of filter used for filtering reference samples is not limited to a 3-tap filter, any other type of filters (e.g., 2-tap filter, 4-tap filter) can be incorporated into this disclosure. In some implementations, a single filter is used for filtering all reference samples. In some alternative implementations, different filters (e.g., filter $[r_0, r_1, r_2]$ and filter $[c_0, c_1, c_2]$ in FIG. 17) are used for filtering different reference samples.

Figure 18:
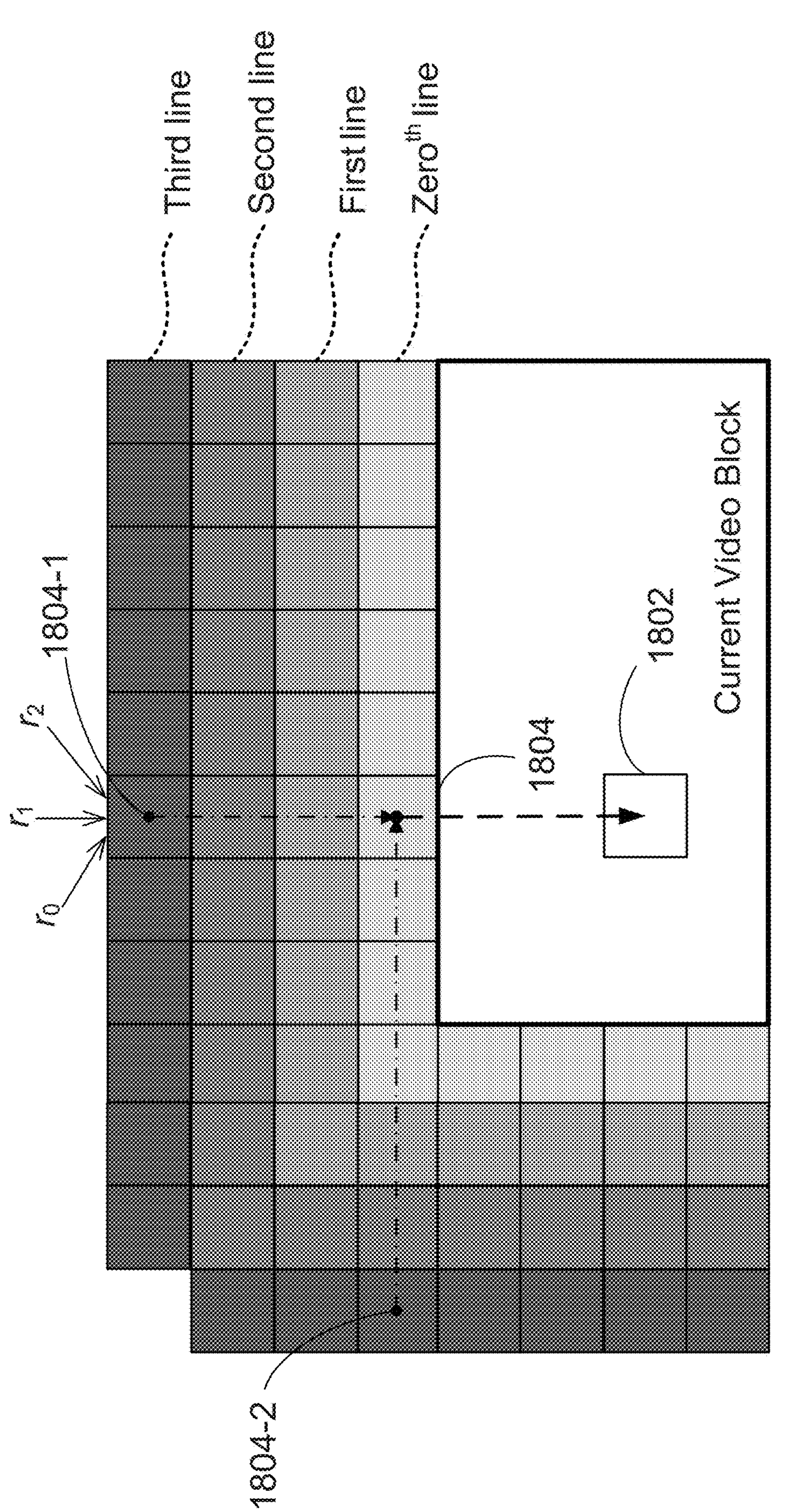
FIG. 18 is an illustration of exemplary derivation of an adaptive reference sample filter using reconstructed samples in accordance with some implementations of the present disclosure.

In some implementations, filter coefficients can be derived using reconstructed samples by a processor either on the encoder side or on the decoder side. For example, FIG. 18 is an illustration of exemplary derivation of an adaptive reference sample filter using reconstructed samples in accordance with some implementations of the present disclosure. As shown in FIG. 18, four lines of reconstructed samples in neighboring blocks (e.g., zeroth line 1801, first line 1803, second line 1805, and third line 1807) are used for determining adaptive reference sample filters (e.g., filter $[r_0, r_1, r_2]$ and filter $[c_0, c_1, c_2]$). Third line 1807 is used as reference samples to predict samples in zeroth line 1801, first line 1803, and second line 1805. The filter $[r_0, r_1, r_2]$ filter may filter the samples in row of third line 1807, and the filter $[c_0, c_1, c_2]$ may filter the samples in column of third line 1807. Each sample in zeroth line 1801, first line 1803, and second line 1805 can be interpolated by filtered samples in third line 1807. For example, as shown in FIG. 18, samples 1804-1 and 1804-2 are first filtered using filter $[r_0, r_1, r_2]$ and filter $[c_0, c_1, c_2]$ by equations like Equations (15-1), (15-2), respectively. Then, sample 1804 can be interpolated based on filtered sample 1804-1 and 1804-2 by equations like Equations (16-1), (16-2), and (17). A cost function, like Equation (18), for all of the predictive samples (e.g., samples in zeroth line 1801, first line 1803, second line 1805, and third line 1807) can be optimized and the filter coefficients (e.g., $[r_0, r_1, r_2]$, $[c_0, c_1, c_2]$) can be solved with Wiener-Hopf equations. The optimized filters may be used to filter reference samples (e.g., in zeroth line 1801). The filtered reference samples are used to interpolate samples in the current video block in planar mode.

It is understood that the type of filter used for filtering reconstructed samples is not limited to a 3-tap filter, any other type of filters (e.g., 2-tap filter, 4-tap filter) can be incorporated into this disclosure. In some implementations, a single filter can be used for filtering all reconstructed samples. In some alternative implementations, different filters (e.g., filter $[r_0, r_1, r_2]$ and filter $[c_0, c_1, c_2]$ in FIG. 18) are used for filtering different reconstructed samples.

Figure 19:
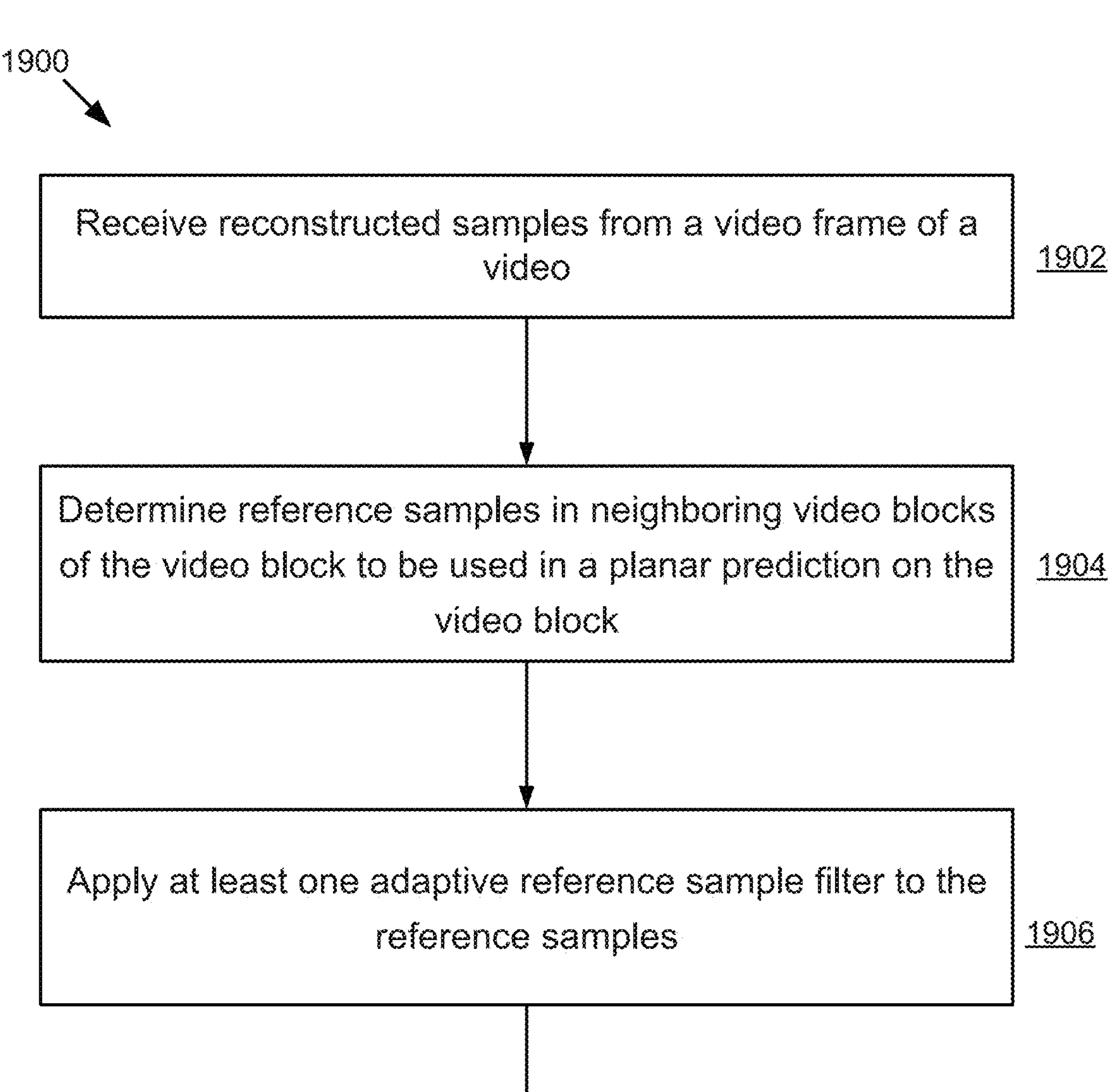
FIG. 19 is a flow chart of an exemplary method for performing planar prediction with an adaptive reference sample filter in accordance with some implementations of the present disclosure.

FIG. 19 is a flow chart of an exemplary method for performing planar prediction with an adaptive reference sample filter in accordance with some implementations of the present disclosure. Method 1900 may be implemented by a processor associated with video encoder 20 or video decoder 30. Method 1900 may include steps 1902-1908 as described below. Some of the steps may be optional to perform the disclosure provided herein. Further, some of the steps may be performed simultaneously, or in a different order.

In step 1902, the processor may receive a video frame of a video. The video frame may include a group of reconstructed samples or blocks that are neighboring block regions of a video block to be predicted (e.g., current video block in FIGS. 17-18). The current video block can be a CTU, or a CU/PU.

In step 1904, for each sample in the current video block, the processor may determine the reference samples for performing planar prediction. For example, as shown in FIG. 17, samples 1704 and 1706 are determined by the processor as the reference samples for interpolating sample 1702 in planar mode.

In step 1906, the processor applies at least one adaptive reference sample filter to the reference samples determined in step 1904. For example, as shown in FIG. 17, filter $[r_0, r_1, r_2]$ and filter $[c_0, c_1, c_2]$ are applied to samples 1704 and 1706, respectively.

In step 1908, the processor performs the planar prediction on each of the samples in the current video block using the reference samples filtered in step 1906. For example, sample 1702 in FIG. 17 is interpolated in planar mode based on filtered samples 1704 and 1706.

In some implementations, adaptive sample filtering (e.g., method 1900) can be performed in conjunction with directional planar interpolation (e.g., method 1600). For example, method 1900 may be performed between steps 1608 and 1610 of method 1600. However, it is contemplated that adaptive sample filtering and directional planar interpolation can also be applied separately and independently from each other. Either technique provides improvements to the performance of intra-prediction.

FIG. 20 is a block diagram illustrating an exemplary block size-based reference sample filtering process 2000 (hereafter referred to as "process 2000") in accordance with some implementations of the present disclosure. In some implementations, process 2000 can be performed by prediction processing unit 41 of video encoder 20, or prediction processing unit 81 of video decoder 30. In some implementations, process 2000 may be performed by a processor (e.g., a processor 2520 as shown in FIG. 25) on an encoder side or a decoder side. For illustration purposes only, the following description of FIG. 20 is provided with respect to the processor. In some implementations, process 2000 may include a reference sample receiving 2002, a reference sample filter determination 2004, and a reference sample filtering 2006.

Initially, the processor may receive a plurality of reference samples in neighboring block regions (e.g., previously decoded blocks) of a video block to be predicted in a video frame of a video in reference sample receiving 2002 (e.g., current video block in FIGS. 17-18).

As mentioned earlier, a video frame in the video may be divided into a plurality of CTUs, then each CTU may be split into smaller video blocks (e.g., CUs) to adapt to varying local characteristics. These video blocks of the video frame may have different sizes, as shown in FIGS. 4C and 4E. In some implementations, to implement reference sample filter determination 2004 on a current video block that is to be predicted based on the plurality of reference samples in neighboring block regions, the processor may adaptively determine a reference sample filter based on the size of the current video block and filter the reference samples with that filter before they are used to predict the block.

In some implementations, the determined reference sample filter is among a plurality of reference sample filters preprogrammed in the processor. For example, the reference sample filters may be trained offline, and then the filter coefficients of the trained filters are preprogrammed into the processor in the encoder and/or the processor in the decoder. Because the reference sample filters are trained offline and separately preprogramed into the encoder and decoder, no signaling of these filters is necessary between the encoder and decoder.

The offline training of the reference sample filters can be performed on a same processor later used for intra prediction, or a separate processor. Images or video frames for training the reference sample filters may be divided into blocks based on statistics or varying local characteristics of the images or the video frames. Blocks of the same size are collected for training a corresponding reference sample filter for that block size. In some implementations, reference samples of the video blocks of the same size are used as the input of training data, and original samples of the video blocks of the same size are used as the target of the training data for deriving filter coefficients of the reference sample filter for that block size. In some implementations, the filter coefficients of the reference sample filter may be derived using a least square method (e.g., Equation (18)). In some implementations, training samples may be collected for different Quantization Parameters (QPs). Accordingly, different reference sample filters may be trained for the different QPs. These reference sample filters may be associated with a same block size but corresponding to different QPs. Each of the reference sample filters are derived using training data compressed with the encoder using a different QP. In some alternative implementations, one reference sample filter may be trained using training data corresponding to all the different QPs collectively.

In some alternative implementations, the determined reference sample filter used to filter the reference samples of the video block is among a plurality of reference sample filters derived adaptively by the encoder based on each video frame. For example, the processor in the encoder may adaptively derive a plurality of reference sample filters based on each video frame. Each of the derived reference sample filters is corresponding to a different video block size in the video frame. The processor then may quantize and signal the derived reference sample filters in a bit stream to the decoder. For example, the filter coefficients of the derived reference sample filters are signalled.

The reference sample filters may be adaptively derived by the processor in the encoder based on two-pass encoding. For example, in a first pass, a default reference sample filter (e.g., [1 2 1]/4) may be used to filter the reference samples of each video block in the video frame. The processor then performs an intra prediction (e.g., angular intra prediction, or planar intra prediction) of the video block using the filtered reference samples to obtain intra prediction samples of each video block. This first pass of compression creates a statistical summary of the video data. For example, covariances for the filters may be collected. The processor in the encoder may derive the reference sample filters each associated with a different video block size guided by the first-pass compression of the video blocks, obtained using the default reference sample filter above. For example, the collected covariances for the filters may be used to derive the reference sample filters. In some implementations, filter coefficients of the reference sample filter may be derived using a least square method (e.g., Equation (18)).

In some implementations, when the video is coded in VVC and ECM, PDPC may be applied after the prediction of angular intra mode. For example, in the first pass, the processor may first perform angular intra prediction on the video blocks using the filtered reference samples, and then perform PDPC to the predicted samples of the video blocks to obtain final intra perdition samples of the video blocks for deriving the reference sample filters.

In a second pass, the processor then compresses each video block by filtering the reference samples using the derived a reference sample filter according to the size of that video block.

In some implementations, the processor may apply the determined reference sample filter to the reference samples in reference sample filtering process 2006. The processor may then perform an intra prediction (e.g., planar prediction) on the current video block using the filtered reference samples. When the processor is in the encoder, the reference sample filters may be retrieved from the memory, or adaptively derived. When the processor is in the encoder and the reference sample filters are adaptively derived by the processor, reference sample filtering process 2006 may be the second pass described above. When the processor is in the decoder, the he reference sample filters may be retrieved from the memory, or obtained from the signalling in the bitstream received from the encoder.

Figure 21:
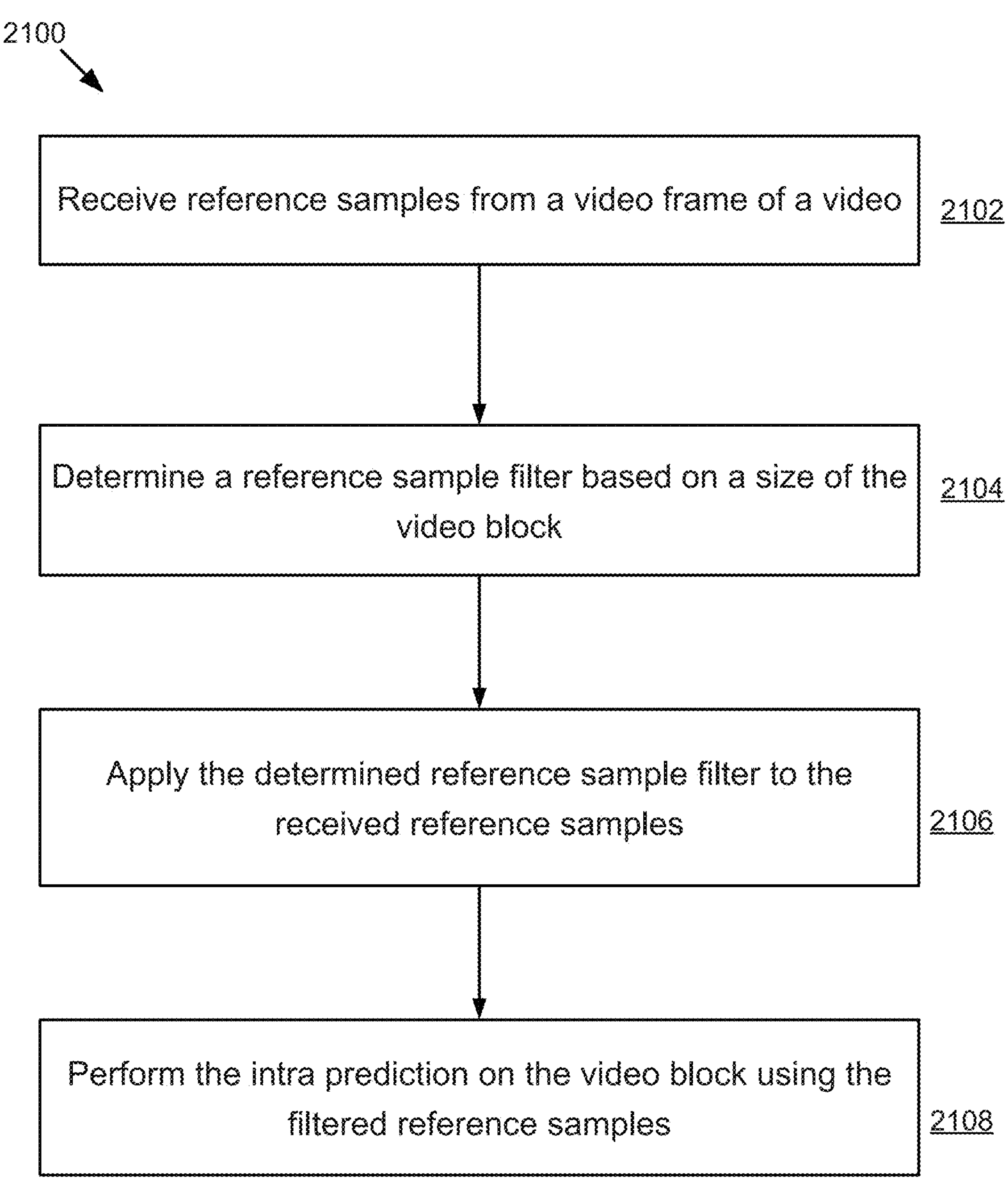
FIG. 21 is a flow chart of an exemplary method for performing reference sample filtering with block size-based reference sample filters in accordance with some implementations of the present disclosure.

FIG. 21 is a flow chart of an exemplary method 2100 for performing reference sample filtering with block size-based reference sample filters in accordance with some implementations of the present disclosure. Method 2100 may be implemented by a processor associated with video encoder 20 or video decoder 30. Method 2100 may include steps 2102-2108 as described below. Some of the steps may be optional to perform the disclosure provided herein. Further, some of the steps may be performed simultaneously, or in a different order.

In step 2102, the processor may receive a video frame of a video. The video frame may include a group of reference samples or blocks that are neighboring block regions of a video block to be predicted (e.g., current video block in FIGS. 17-18). The current video block can be a CTU, or a CU/PU.

In step 2104, the processor may determine the size of each video block, and for each video block size, the processor may determine a reference sample filter to filter the received reference samples of the video blocks of that size. In some implementations, the processor may determine the reference sample filter among a plurality of reference sample filters that are preprogrammed in the processor. The preprogrammed reference sample filters may be trained offline by the same processor or a different processor.

Figure 22:
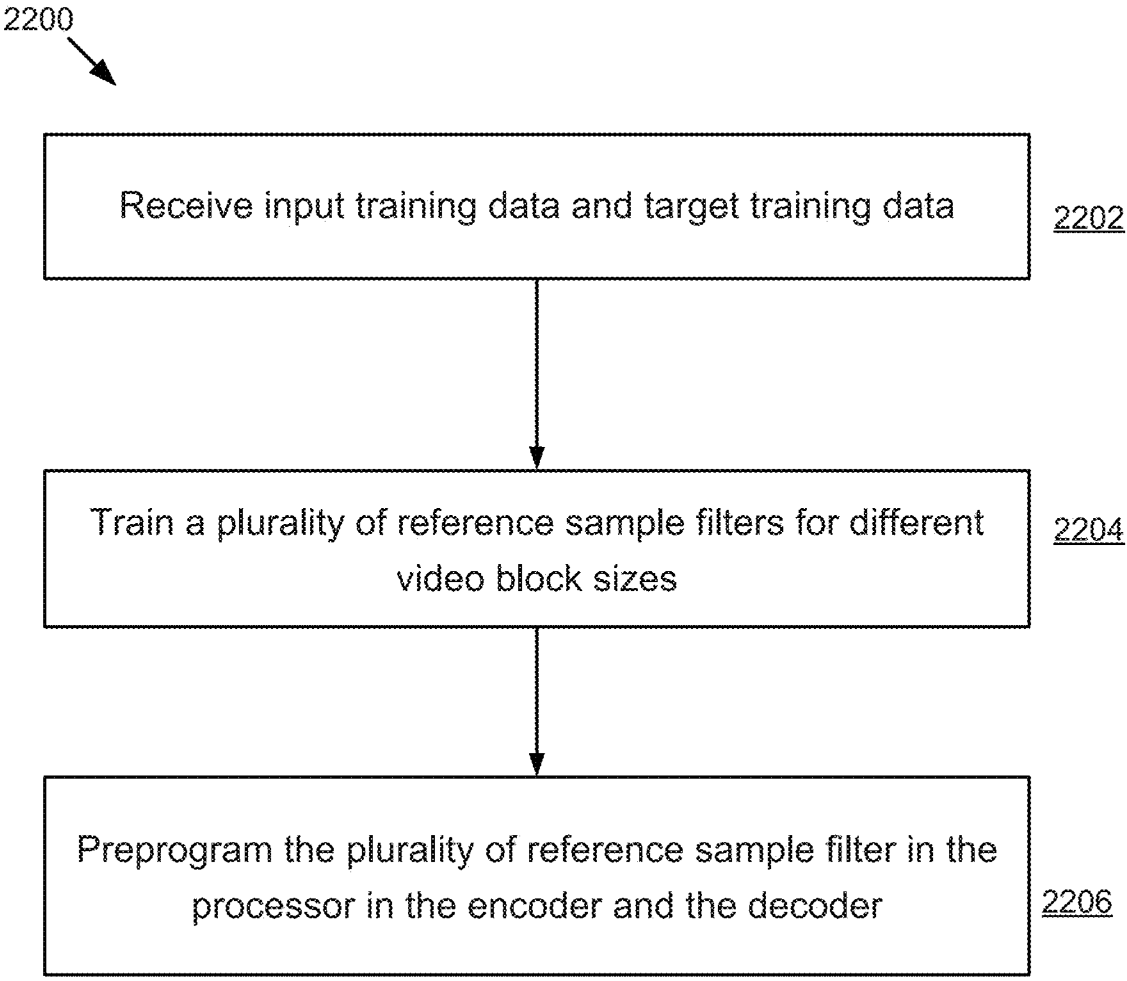
FIG. 22 is a flow chart of an exemplary method for training fixed block size-based reference sample filters offline in accordance with some implementations of the present disclosure.

For example, FIG. 22 is a flow chart of an exemplary method 2200 for training fixed block size-based reference sample filters offline in accordance with some implementations of the present disclosure. In step 2202, the processor may receive input training data and target training data. For example, the input training data may be reference samples obtained by compressing original samples of video blocks at different sizes with an encoder. The target training data may be the corresponding original samples of the video blocks. In step 2204, the processor may derive a plurality of reference sample filters based on the input training data and the target training data using a least square method (e.g., Equation (18)). In some implementations, when the training data are collected and compressed with the encoder using different QPs, a reference sample filter associated with the corresponding block size may be derived for each different QP or for all the different QPs collectively. In step 2206, the filter coefficients of the derived plurality of reference sample filters are preprogramed in the processor of the encoder and/or the decoder. The derived reference sample filters may also be pre-stored in a lookup table and saved in a memory (e.g., memory 2530 in FIG. 25).

Returning to step 2104 of FIG. 21, in some alternative implementations, the processor may determine the reference sample filter among a plurality of reference sample filters that are adaptively derived based on the video frame.

Figure 23:
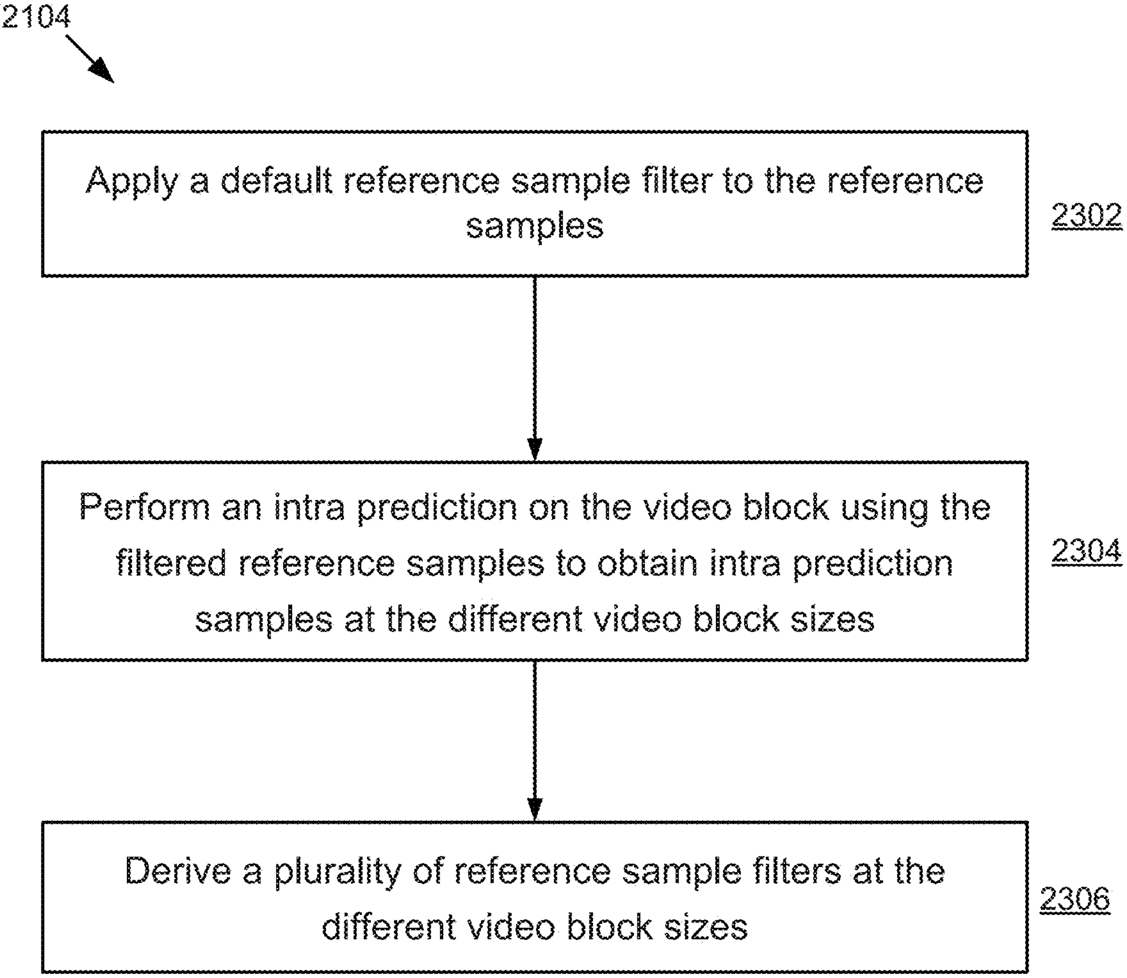
FIG. 23 is a flow chart of an exemplary method for determining adaptive block size-based reference sample filters in accordance with some implementations of the present disclosure.

For example, FIG. 23 is a flow chart of an exemplary method for determining adaptive block size-based reference sample filters in accordance with some implementations of the present disclosure. In step 2302, the processor may apply a default reference sample filter (e.g., [1 2 1]/4) to reference samples of each video block in the video frame to obtained filtered reference samples. In step 2304, the processor may perform an intra prediction (e.g., planar prediction, angular intra prediction) on each video block using the filtered reference samples of the video block to obtain the intra prediction samples of each video block. In step 2306, the processor may further derive a reference sample filter for each video block size of the video frame using a least square method (e.g., Equation (18)) based on the reference samples of each video block of that size and the corresponding predicted samples of the video block (predicted in step 2304). The derived reference sample filters are signalled in a bit stream to the decoder.

Returning to FIG. 21, the processor applies the determined reference sample filter, according to the size of the current video block, to the reference samples of the video block in step 2106. When the processor is in the decoder, the determined reference sample filter is retrieved from the processor or memory if it is preprogrammed, or obtained from the signaling in the bit stream if it is adaptively derived based on the video frame.

In step 2108, the processor performs the intra prediction (e.g., planar prediction) on samples in the video block using the reference samples filtered in step 2106.

In some implementations, block size-based reference sample filtering (e.g., method 2100) can be performed in conjunction with directional planar interpolation (e.g., method 1600). For example, method 2100 may be performed between steps 1608 and 1610 of method 1600. However, it is contemplated that block size-based reference sample filtering and directional planar interpolation can also be applied separately and independently from each other. Either technique provides improvements to the performance of intra-prediction.

Figure 24B:
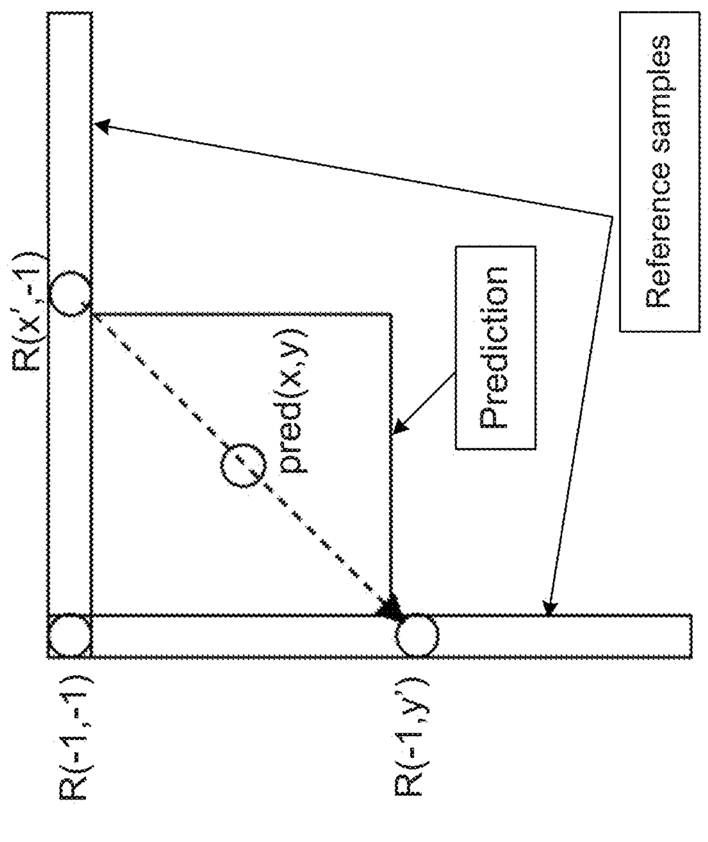
FIGS. 24A and 24B illustrate diagrams of reference samples for Position-Dependent intra Prediction Combination (PDPC) in a top-right diagonal mode and a bottom-left diagonal mode, respectively, in accordance with some implementations of the present disclosure.
Figure 24A:
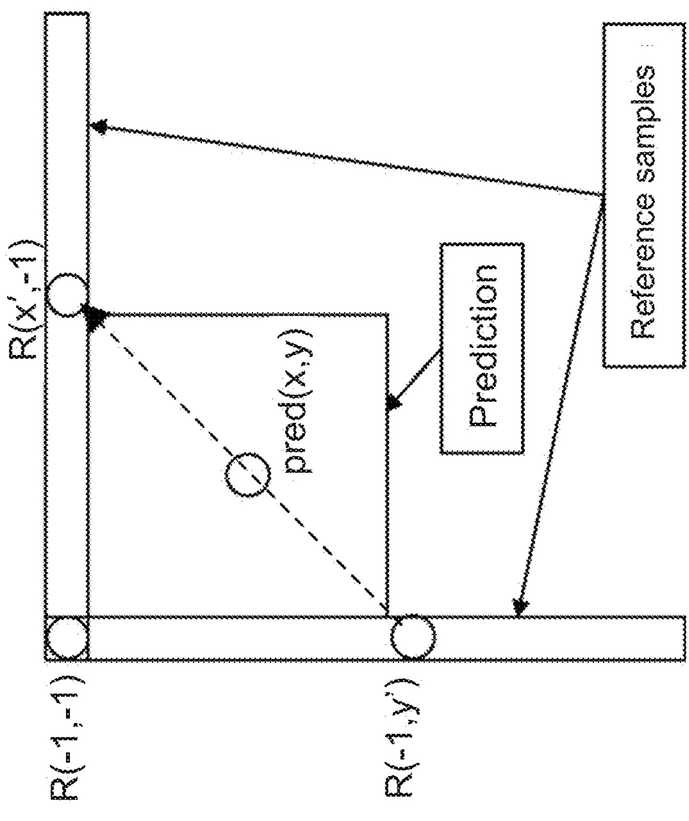

FIGS. 24A and 24B illustrate diagrams of reference samples for PDPC in a top-right diagonal mode and a bottom-left diagonal mode respectively. The prediction sample pred(x, y) is located at (x, y) in the prediction block. The reference sample $R_{x',-1}$ has a horizontal coordinate of x'=x+y+1 and a vertical coordinate of −1, and the reference sample $R_{-1,y'}$ has a horizontal coordinate of −1 and a vertical coordinate of y'=x+y+1.

Assuming that pred(x, y) is the prediction sample of a current sample, a modified prediction sample pred'(x, y) obtained by performing the PDPC can be calculated according to Equation (19):

$$pred'(x, y) = Clip3(0, 1 << BitDepth) - 1, \quad (wL \times R_{-1,y'} + wT \times R_{x',-1} + (64 - wL - wT) \times pred(x, y) + 32) >> 6, \tag{19}$$

where Bitdepth represents a bit depth of samples; $R_{x',-1}$ and $R_{-1,y'}$ represent reference samples located at top and left boundaries of the current sample, respectively; wL and wT are weights which are adaptively selected according to an intra mode and a block size of the current block; ">>" represents a bitwise right shift operation; and "<<" indicates a bitwise left shift operation.

The function Clip3(x, y, z) in the above equation may be defined as in Equation (20):

$$Clip3(x, y, z) = \begin{cases} x & z < x \\ y & z > y \\ z & \text{otherwise} \end{cases}. \tag{20}$$

FIG. 25 shows a computing environment 2510 coupled with a user interface 2550, according to some implementations of the present disclosure. The computing environment 2510 can be part of a data processing server. Consistent with the present disclosure, video encoder 20 and video decoder 30 can be implemented using the computing environment 2010. The computing environment 2510 includes a processor 2520, a memory 2530, and an Input/Output (I/O) interface 2540.

The processor 2520 typically controls overall operations of the computing environment 2510, such as the operations associated with display, data acquisition, data communications, and image processing. Processor 2520 may include one or more processors to execute instructions to perform all or some of the steps in the above-described methods. Moreover, processor 2520 may include one or more modules that facilitate the interaction between the processor 2520 and other components. The processor 2520 may be a Central Processing Unit (CPU), a microprocessor, a single chip machine, a Graphical Processing Unit (GPU), or the like.

Memory 2530 is configured to store various types of data to support the operation of the computing environment 2510. The memory 2530 may include predetermined software 2532. Examples of such data include instructions for any applications or methods operated on the computing environment 2510, video datasets, image data, etc. The memory 2530 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The I/O interface 2540 provides an interface between the processor 2520 and peripheral interface modules, such as a keyboard, a click wheel, buttons, or the like. The buttons may include but are not limited to, a home button, a start scan button, and a stop scan button. The I/O interface 2540 can be coupled with an encoder and decoder.

In some implementations, there is also provided a non-transitory computer-readable storage medium comprising a plurality of programs, for example, in the memory 2530, executable by the processor 2520 in the computing environment 2510, for performing the above-described methods. Alternatively, the non-transitory computer-readable storage medium may have stored therein a bitstream or a data stream comprising encoded video information (for example, video information comprising one or more syntax elements) generated by an encoder (for example, video encoder 20 in FIG. 2) using, for example, the encoding method described above for use by a decoder (for example, video decoder 30 in FIG. 3) in decoding video data. The non-transitory computer-readable storage medium may be, for example, a ROM, a Random Access Memory (RAM), a CD-ROM, a magnetic tape, a floppy disc, an optical data storage device or the like.

In some implementations, there is also provided a computing device comprising one or more processors (for example, the processor 2520); and the non-transitory computer-readable storage medium or the memory 2530 having stored therein a plurality of programs executable by the one or more processors, wherein the one or more processors, upon execution of the plurality of programs, are configured to perform the above-described methods.

In some implementations, there is also provided a computer program product comprising a plurality of programs, for example, in memory 2530, executable by the processor 2520 in the computing environment 2510, for performing the above-described methods. For example, the computer program product may include the non-transitory computer-readable storage medium.

In some implementations, the computing environment 2510 may be implemented with one or more ASICs, DSPs, Digital Signal Processing Devices (DSPDs), Programmable Logic Devices (PLDs), FPGAs, GPUs, controllers, micro-controllers, microprocessors, or other electronic components, for performing the above methods.

The description of the present disclosure has been presented for the purpose of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

Unless specifically stated otherwise, an order of steps of the method according to the present disclosure is only intended to be illustrative, and the steps of the method according to the present disclosure are not limited to the order specifically described above, but may be changed according to practical conditions. In addition, at least one of the steps of the method according to the present disclosure may be adjusted, combined or deleted according to practical requirements.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A video processing method for performing intra prediction, comprising:

receiving reference samples from a video bitstream comprising a video block;

determining a reference sample filter corresponding to a size of each video block among a plurality of reference sample filters each derived for a different video block size;

applying the determined reference sample filter to the received reference samples; and performing the intra prediction on the video block using the filtered reference samples, wherein the plurality of reference sample filters are trained with training data, comprising reference samples obtained by compressing original samples at the different video block sizes with an encoder as input training data and the corresponding original samples as target training data.

2. The video processing method of claim 1, wherein for each different video block size, the reference samples are obtained by compressing the original samples by the encoder using different Quantization Parameters (QPs).

3. The video processing method of claim 2, wherein the reference sample filter for each different video block size comprises a group of reference sample filters each derived using training data corresponding to each different QP; or wherein the reference sample filter for each different video block size is derived using training data corresponding to all the different QPs collectively.

4. The video processing method of claim 1, wherein filter coefficients of each reference sample filter are preprogrammed in a processor, wherein the filter coefficients are derived by optimizing a least-square cost function.

5. The video processing method of claim 1, wherein the video processing method is performed by an encoder, and the method further comprises:

deriving the plurality of reference sample filters for the different video block sizes; and signaling the derived reference sample filters in a bit stream to a decoder.

6. The video processing method of claim 1, wherein the plurality of reference sample filters are adaptively derived for each video frame of the video, wherein the derived reference sample filters are signaled for each video frame.

7. The video processing method of claim 5, wherein deriving the plurality of reference sample filters for the different video block sizes further comprises:

applying a default reference sample filter to the received reference samples;

performing a first-pass compression on the video blocks using the filtered reference samples; and deriving the plurality of reference sample filters for the different video block sizes using the first-pass compression result.

8. The video processing method of claim 1, wherein the video processing method is performed by a decoder, and the method further comprises:

receiving a bitstream comprising a coded video block and signaling of the plurality of reference sample filters for the different video block sizes.

9. A video processing apparatus for performing intra prediction, comprising:

a memory coupled to one or more processors; and the one or more processors configured to:

receive reference samples from a video frame of a video bitstream comprising a video block;

determine a reference sample filter corresponding to a size of each video block among a plurality of reference sample filters each derived for a different video block size;

apply the determined reference sample filter to the received reference samples; and perform the intra prediction on the video block using the filtered reference samples, wherein the plurality of reference sample filters are trained with training data, comprising reference samples obtained by compressing original samples at the different video block sizes with an encoder as input training data and the corresponding original samples as target training data.

10. The video processing apparatus of claim 9, wherein for each different video block size, the reference samples are obtained by compressing the original samples by the encoder using different Quantization Parameters (QPs).

11. The video processing apparatus of claim 10, wherein the reference sample filter for each different video block size comprises a group of reference sample filters each derived using training data corresponding to each different QP; or wherein the reference sample filter for each different video block size is derived using training data corresponding to all the different QPs collectively.

12. The video processing apparatus of claim 9, wherein filter coefficients of each reference sample filter are preprogrammed in the one or more processors, wherein the filter coefficients are derived by optimizing a least-square cost function.

13. The video processing apparatus of claim 9, wherein the one or more processors are in an encoder, wherein the one or more processors are further configured to:

derive the plurality of reference sample filters for the different video block sizes; and signal the derived reference sample filters in a bit stream to a decoder.

14. The video processing apparatus of claim 9, wherein the plurality of reference sample filters are adaptively derived, by the one or more processors, for each video frame of the video, wherein the derived reference sample filters are signaled for each video frame.

15. The video processing apparatus of claim 13, wherein to derive the plurality of reference sample filters for the different video block sizes, the one or more processors are further configured to:

apply a default reference sample filter to the received reference samples;

perform a first-pass compression on the video blocks using the filtered reference samples; and derive the plurality of reference sample filters for the different video block sizes using the first-pass compression result.

16. The video processing apparatus of claim 9, wherein the one or more processors are in a decoder, wherein the one or more processors are further configured to:

receive a bitstream comprising a coded video block and signaling of the plurality of reference sample filters for the different video block sizes.

17. A non-transitory computer-readable storage medium having stored therein a video bitstream to be processed by a video processing method for performing intra prediction, comprising:

receiving reference samples from a video frame of the video bitstream comprising a video block;

determining a reference sample filter corresponding to a size of each video block among a plurality of reference sample filters each derived for a different video block size;

applying the determined reference sample filter to the received reference samples; and performing the intra prediction on the video block using the filtered reference samples, wherein the plurality of reference sample filters are trained with training data, comprising reference samples obtained by compressing original samples at the different video block sizes with an encoder as input training data and the corresponding original samples as target training data.

18. A method for storing a bitstream, comprising:

performing the video processing method according to claim 1 to generate a bitstream; and storing the bitstream.

* * * * *